United States Patent
Hironishi et al.

(10) Patent No.: US 8,886,057 B2
(45) Date of Patent: Nov. 11, 2014

(54) OPTICAL RECEIVER, SIGNAL PROCESSOR, AND OPTICAL RECEIVING METHOD

(75) Inventors: Kazuo Hironishi, Kawasaki (JP); Takeshi Hoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 240 days.

(21) Appl. No.: 13/325,681

(22) Filed: Dec. 14, 2011

(65) Prior Publication Data

US 2012/0213532 A1 Aug. 23, 2012

(30) Foreign Application Priority Data

Feb. 23, 2011 (JP) .................................. 2011-037685

(51) Int. Cl.
*H04B 10/06* (2006.01)
*H04B 10/61* (2013.01)

(52) U.S. Cl.
CPC ........ *H04B 10/6161* (2013.01); *H04B 10/6165* (2013.01)
USPC ........... 398/208; 398/202; 398/159; 398/147; 398/25

(58) Field of Classification Search
CPC ........ H04B 10/60; H04B 10/61; H04B 10/66; H04B 10/695; H04B 10/25133; H04B 10/5561; H04B 10/6971; H04B 10/07951; H04B 10/2513; H04B 10/50577; H04B 10/6161; H04B 10/6165
USPC ........... 398/202–205, 208, 210, 25, 159, 158, 398/147, 148, 29, 81

See application file for complete search history.

(56) References Cited

U.S. PATENT DOCUMENTS

| 5,247,382 | A | 9/1993 | Suzuki |
| 7,817,923 | B2 * | 10/2010 | Akiyama et al. ............... 398/188 |
| 8,005,368 | B2 * | 8/2011 | Roberts et al. ................. 398/150 |
| 8,184,992 | B2 * | 5/2012 | Kikuchi ......................... 398/202 |
| 8,437,645 | B2 * | 5/2013 | Boffi et al. ..................... 398/208 |

(Continued)

FOREIGN PATENT DOCUMENTS

| JP | 4-109722 A | 4/1992 |
| JP | 2011-015013 | 1/2011 |

OTHER PUBLICATIONS

Rasmussen, J. C. et al., "Digital Coherent Receiver Technology for 100-Gb/s Optical Transport Systems", Fujitsu Scientific & Technical Journal, vol. 46, No. 1, Jan 1, 2010, pp. 63-71. Corresponding to Digital Coherent Receiver Technology for 100-Gbps Optical Transport Systems.

(Continued)

*Primary Examiner* — Daniel Washburn
*Assistant Examiner* — Hibret Woldekidan
(74) *Attorney, Agent, or Firm* — Fujitsu Patent Center

(57) ABSTRACT

An optical receiver includes a splitter that splits a local oscillator lightwave into a first local oscillator lightwave and a second local oscillator lightwave; a measurement unit that measures phase variation of the first local oscillator lightwave; a receiving unit that receives a signal lightwave and the second local oscillator lightwave and mixes these lightwaves and converts the mixed lightwaves into digital signal; a dispersion compensator that reduces chromatic dispersion of the digital signal; a phase processing unit that rotates phase of the dispersion-reduced signal based on the phase variation; and a discriminating unit that discriminates the phase-rotated signal.

11 Claims, 31 Drawing Sheets

(56) References Cited

U.S. PATENT DOCUMENTS

| | | | |
|---|---|---|---|
| 8,565,615 B2 * | 10/2013 | Nishihara et al. | 398/183 |
| 8,649,689 B2 * | 2/2014 | Koizumi et al. | 398/204 |
| 8,693,886 B2 * | 4/2014 | Kikuchi | 398/159 |
| 2005/0149791 A1 * | 7/2005 | Nishimoto | 714/724 |
| 2009/0190926 A1 * | 7/2009 | Charlet et al. | 398/74 |
| 2009/0214201 A1 * | 8/2009 | Oda et al. | 398/25 |
| 2009/0317092 A1 * | 12/2009 | Nakashima et al. | 398/204 |
| 2010/0003036 A1 * | 1/2010 | Kuwata et al. | 398/183 |
| 2010/0329698 A1 | 12/2010 | Nakashima | |
| 2011/0002689 A1 * | 1/2011 | Sano et al. | 398/44 |
| 2011/0103795 A1 * | 5/2011 | Khandani et al. | 398/65 |
| 2011/0170881 A1 * | 7/2011 | Nakashima et al. | 398/209 |
| 2012/0027404 A1 * | 2/2012 | Secondini et al. | 398/25 |
| 2012/0070159 A1 * | 3/2012 | Ishihara et al. | 398/202 |

OTHER PUBLICATIONS

Rasmussen, J. C. et al., "Digital Coherent Receiver Technology for 100-Gbps Optical Transport Systems", Fujitsu. 60, 5, (09, 2009), pp. 476-483. Corresponding to Digital Coherent Receiver Technology for 100-Gb/s Optical Transport Systems.

Secondini, M et al., "Phase Noise Cancellation in Coherent Optical Receivers by Digital Coherence Enhancement", ECOC 2010, Sep. 19-23, 2010, pp. 4.17.

Shieh, William et al., "Coherent optical OFDM: has its time come? [Invited]", Journal of Optical Networking, vol. 7, No. 3, Mar. 2008, pp. 234-255.

Shieh, William et al., "Equalization-enhanced phase noise for coherent-detection systems using electronic digital signal processing", Optics Express, vol. 16, No. 20, Sep. 29, 2008, pp. 15718-15727.

Xie, Chongjin "Local Oscillator Phase Noise Induced Penalties in Optical Coherent Detection Systems Using Electronic Chromatic Dispersion Compensation", OFC 2009.

Colavolpe, G., et al., "Phase Noise Sensitivity and Compensation Techniques in Long-Haul Coherent Optical Links", GLOBECOM 2010, Dec. 2010, IEEE, USA.

JPOA—Office Action of Japanese Patent Application No. 2011-037685 dated Sep. 30, 2014, with English-translation of the relevant part, p. 1, line 18 to p. 2, line 16 of the Office Action.

* cited by examiner

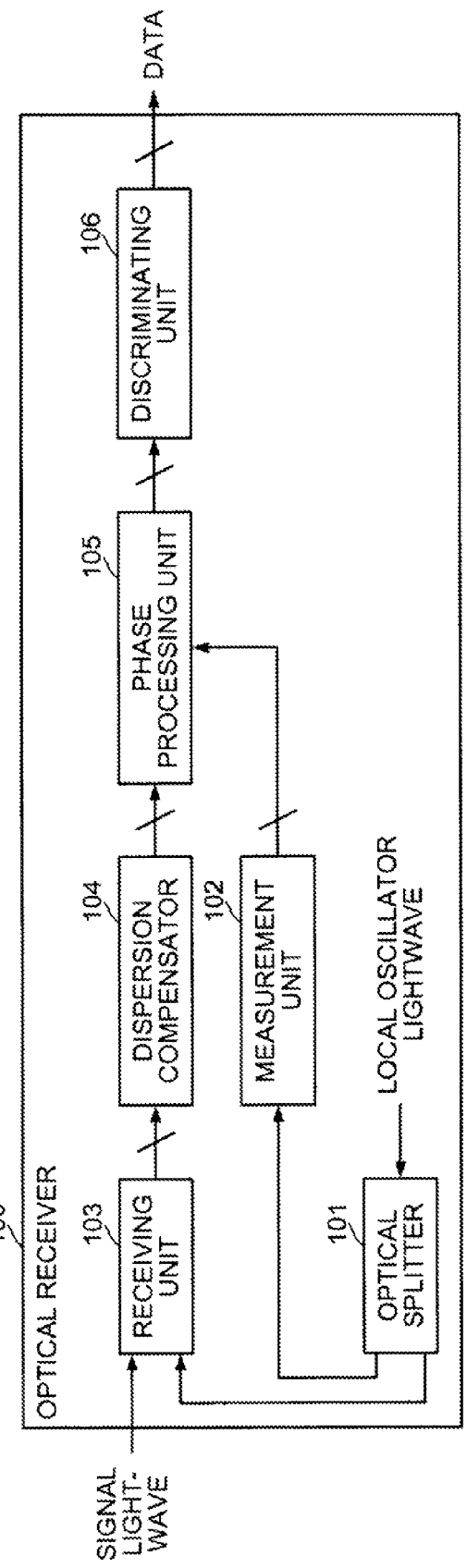

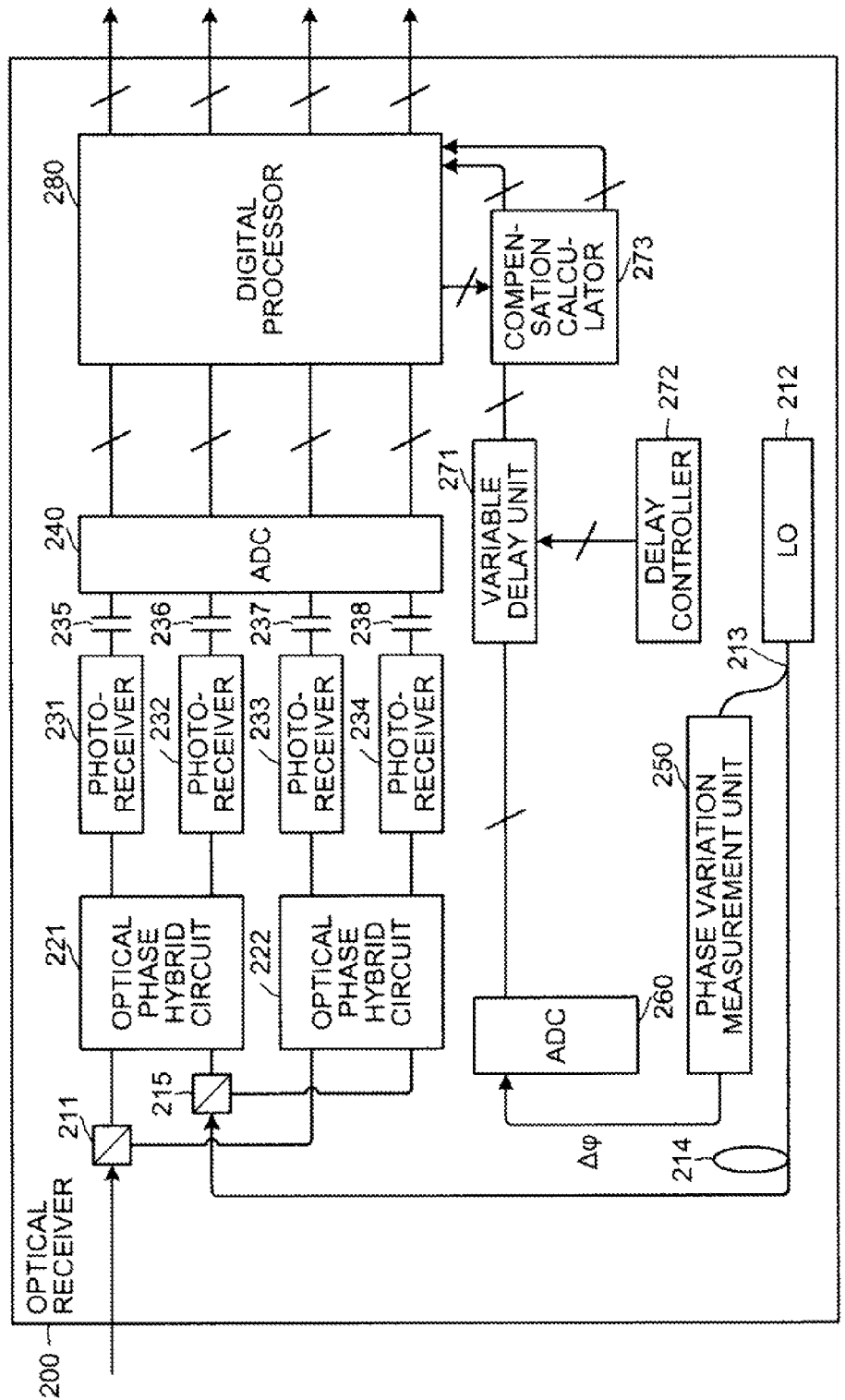

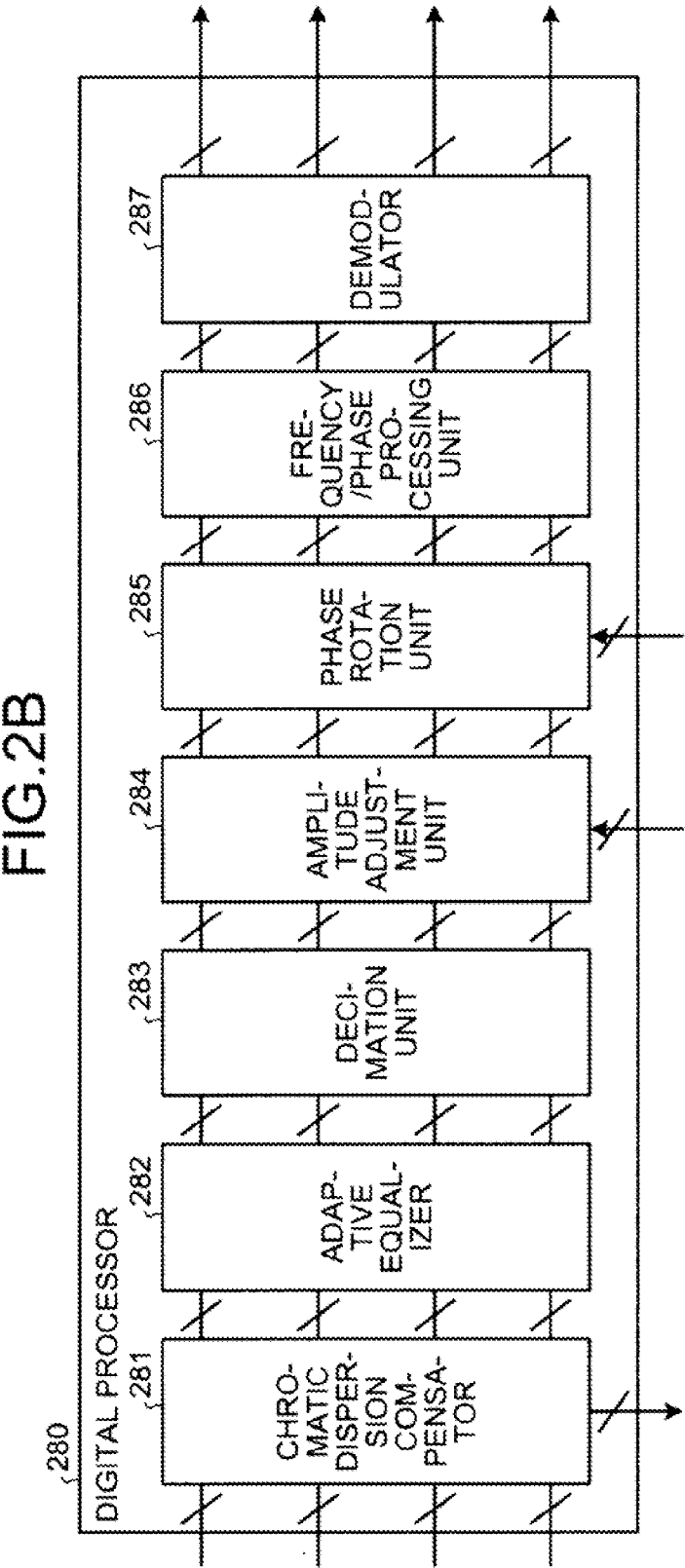

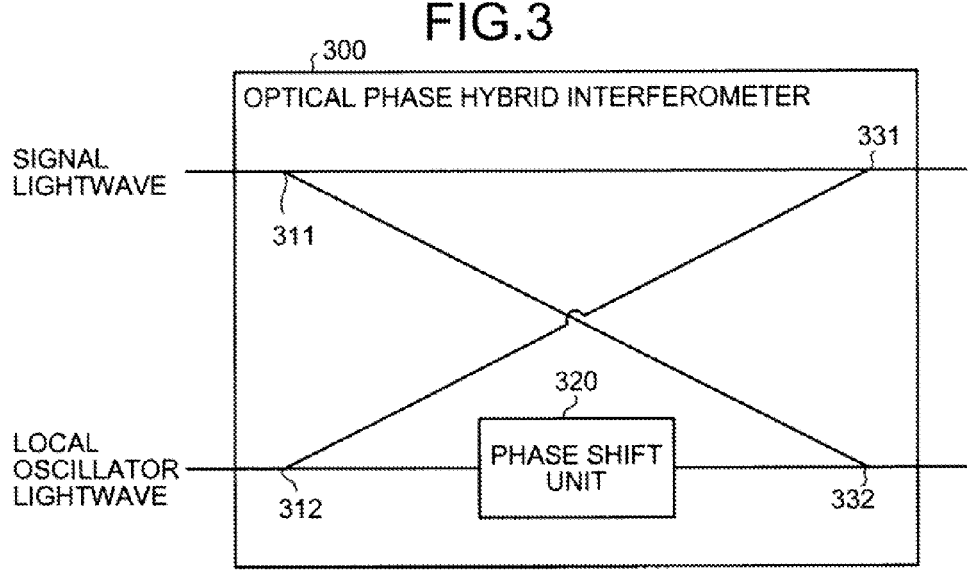

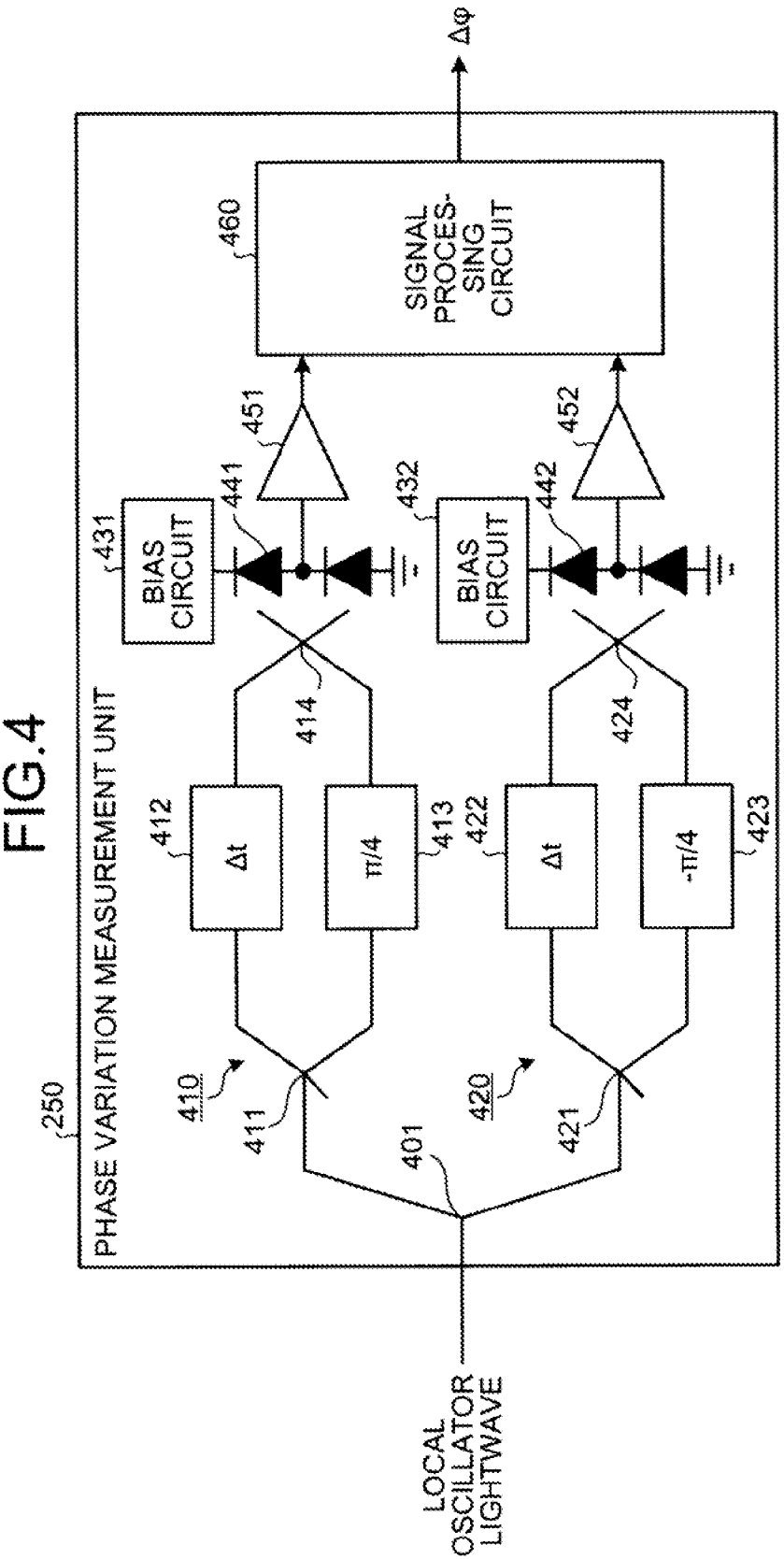

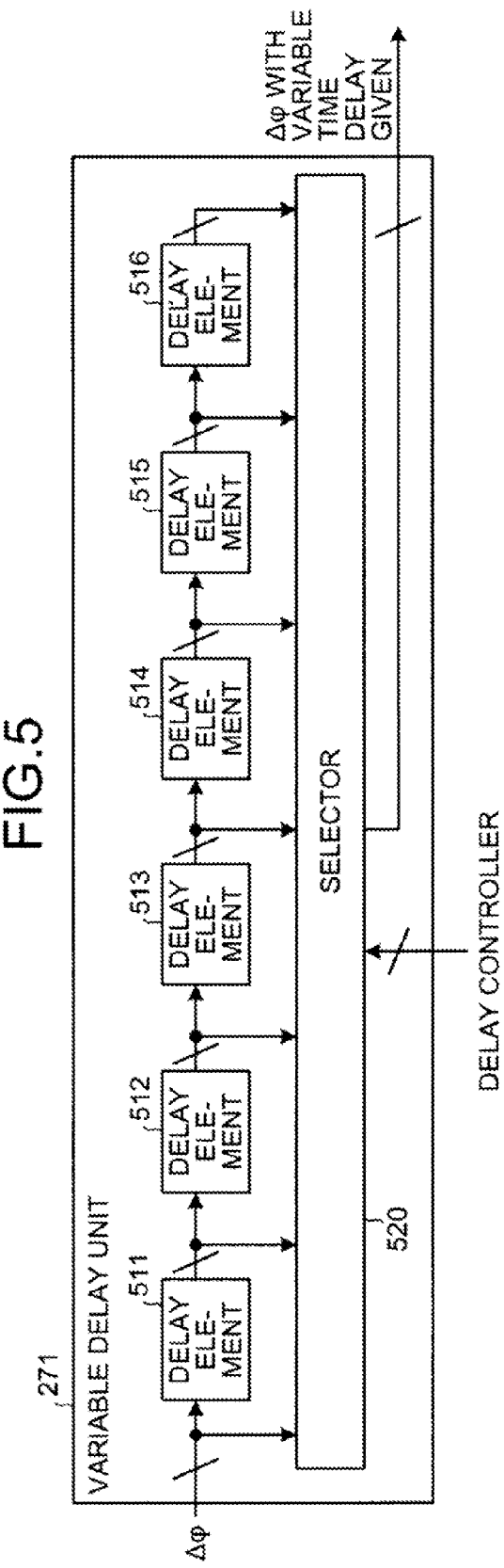

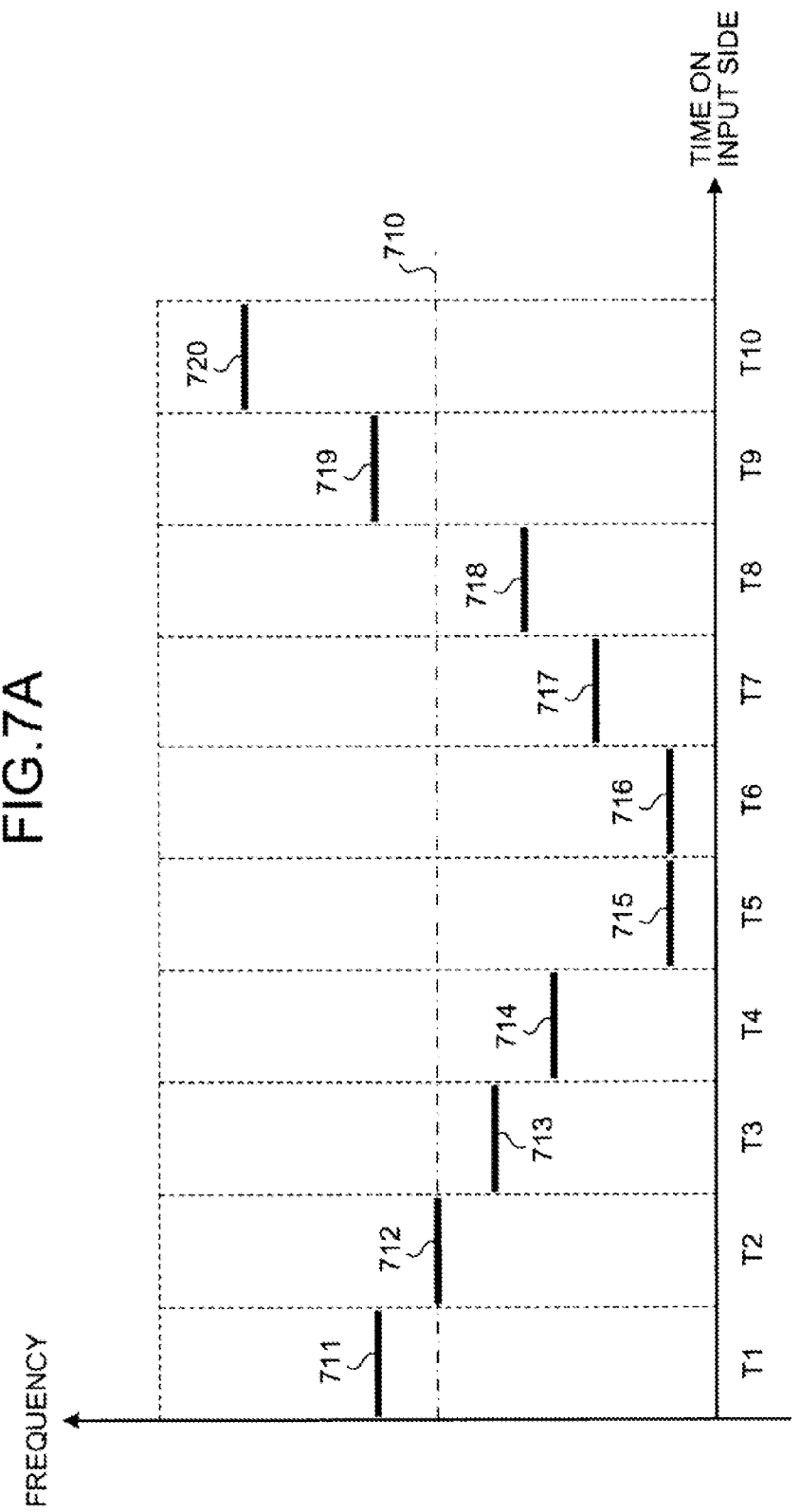

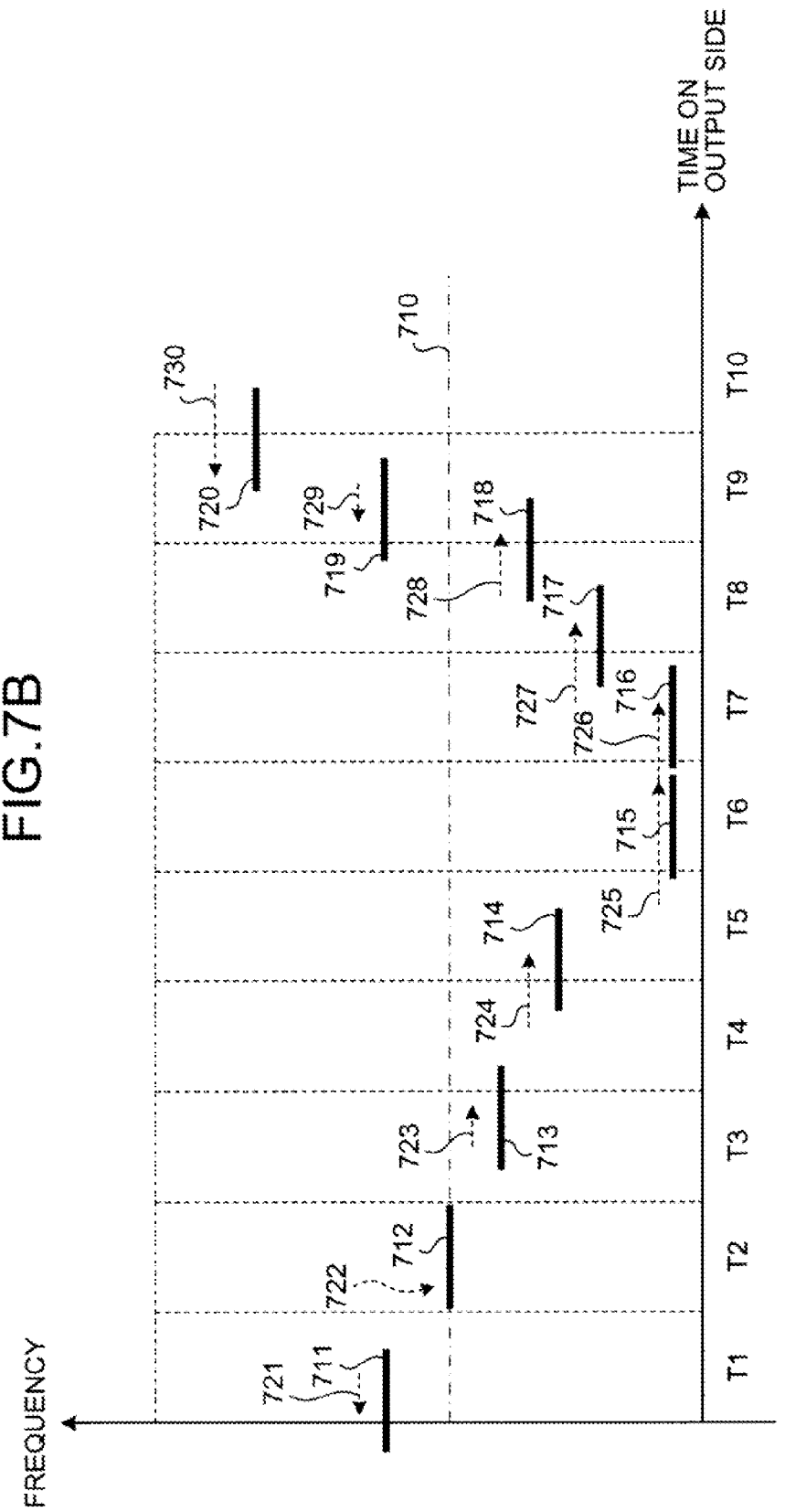

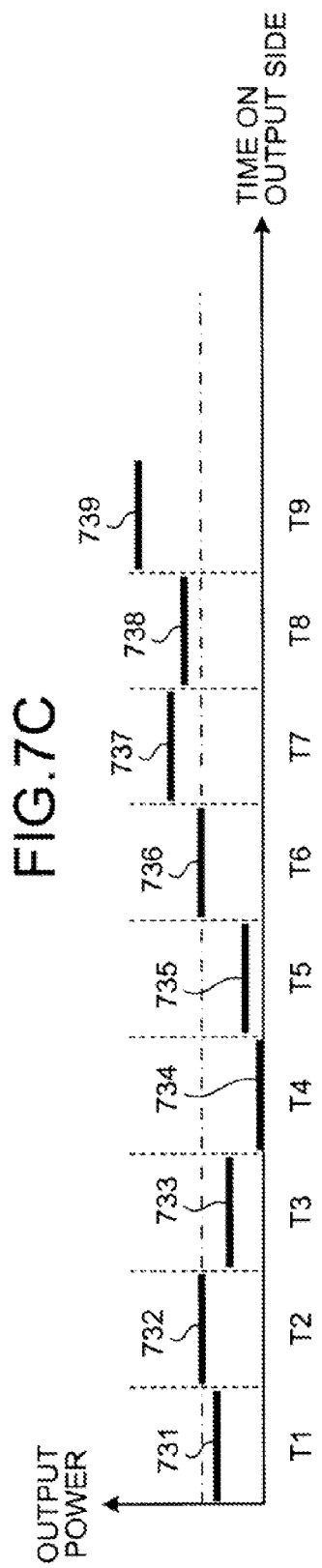

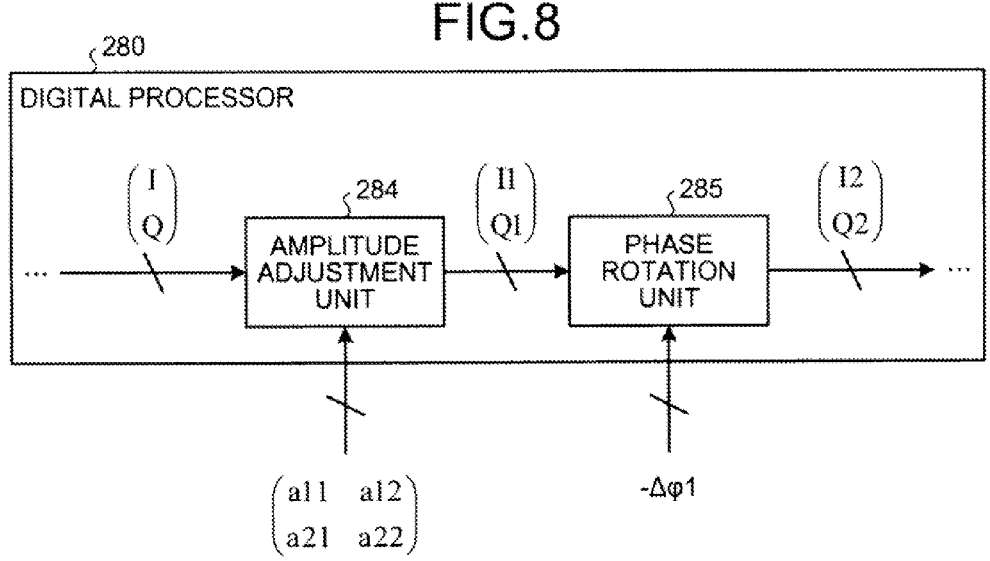

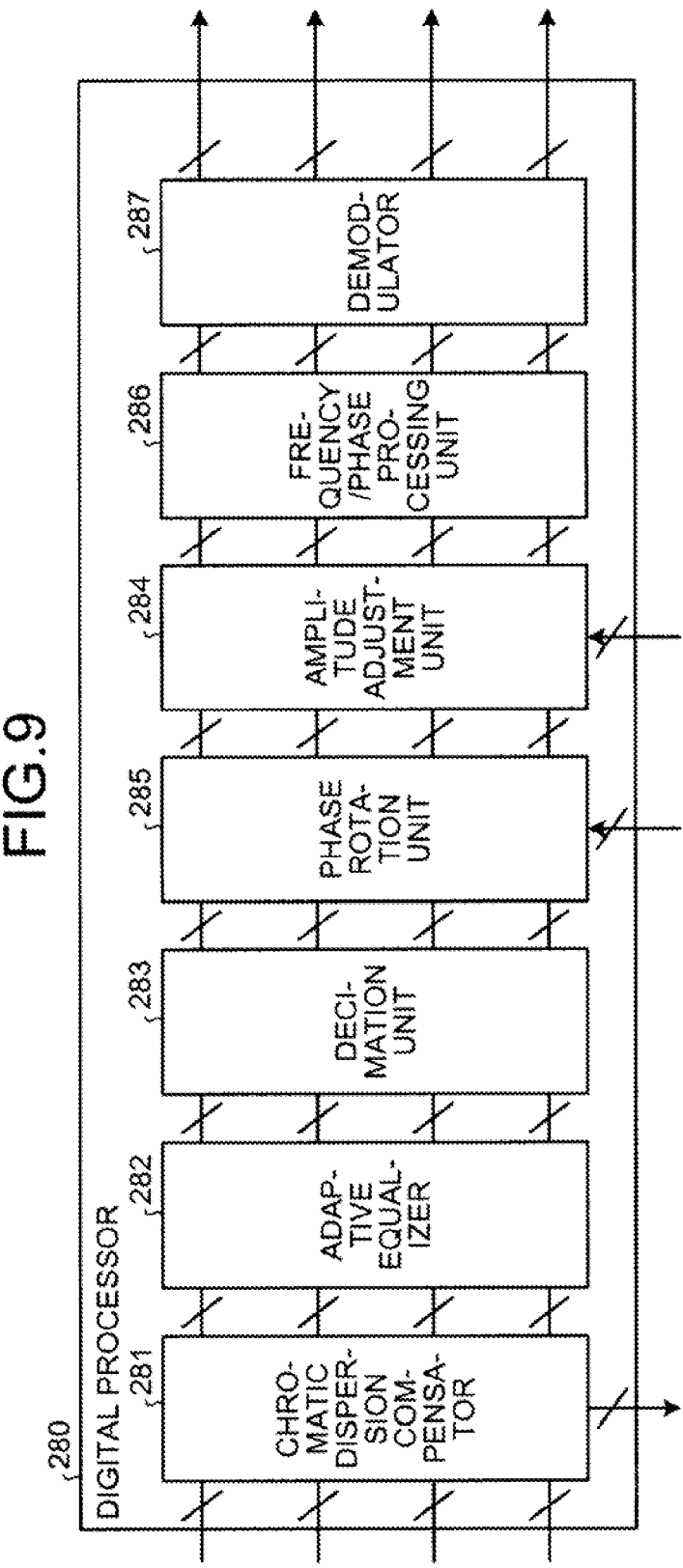

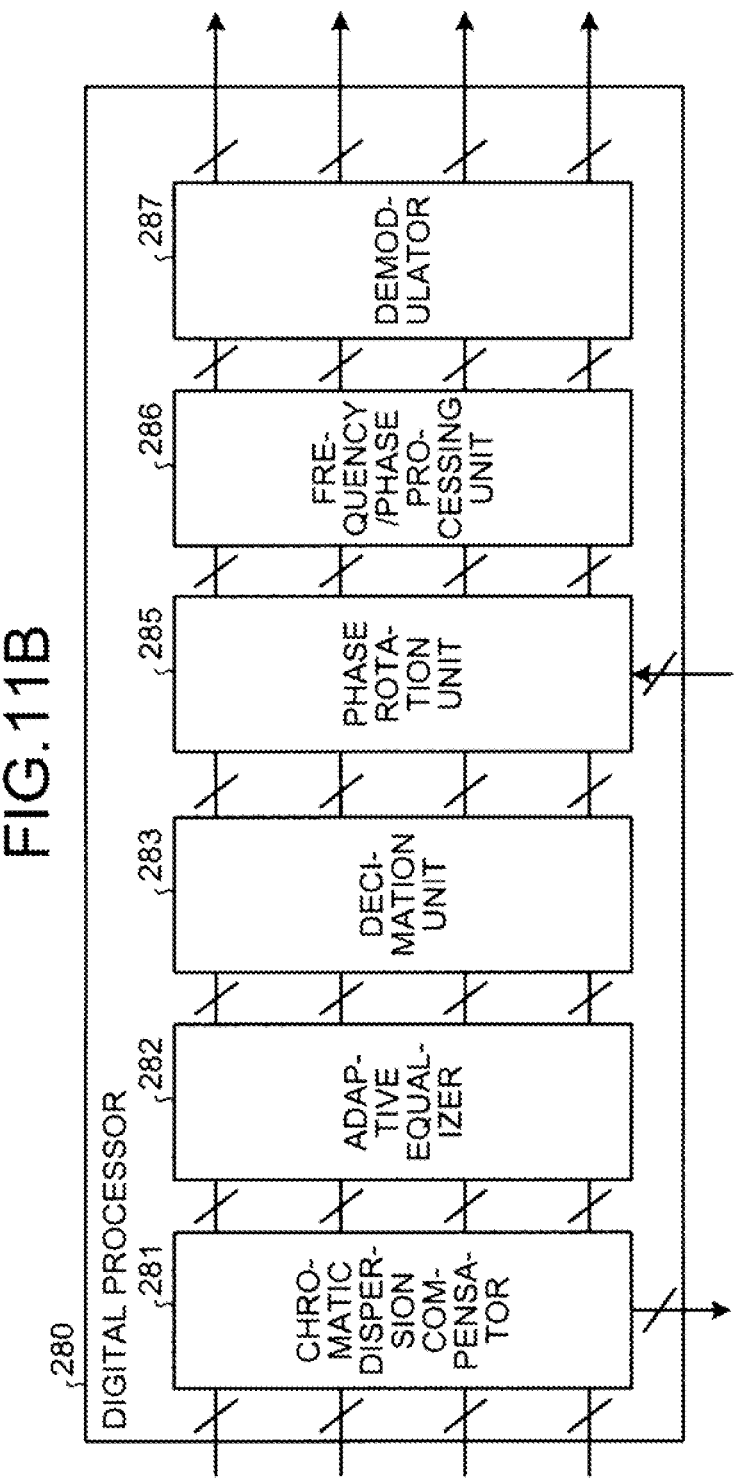

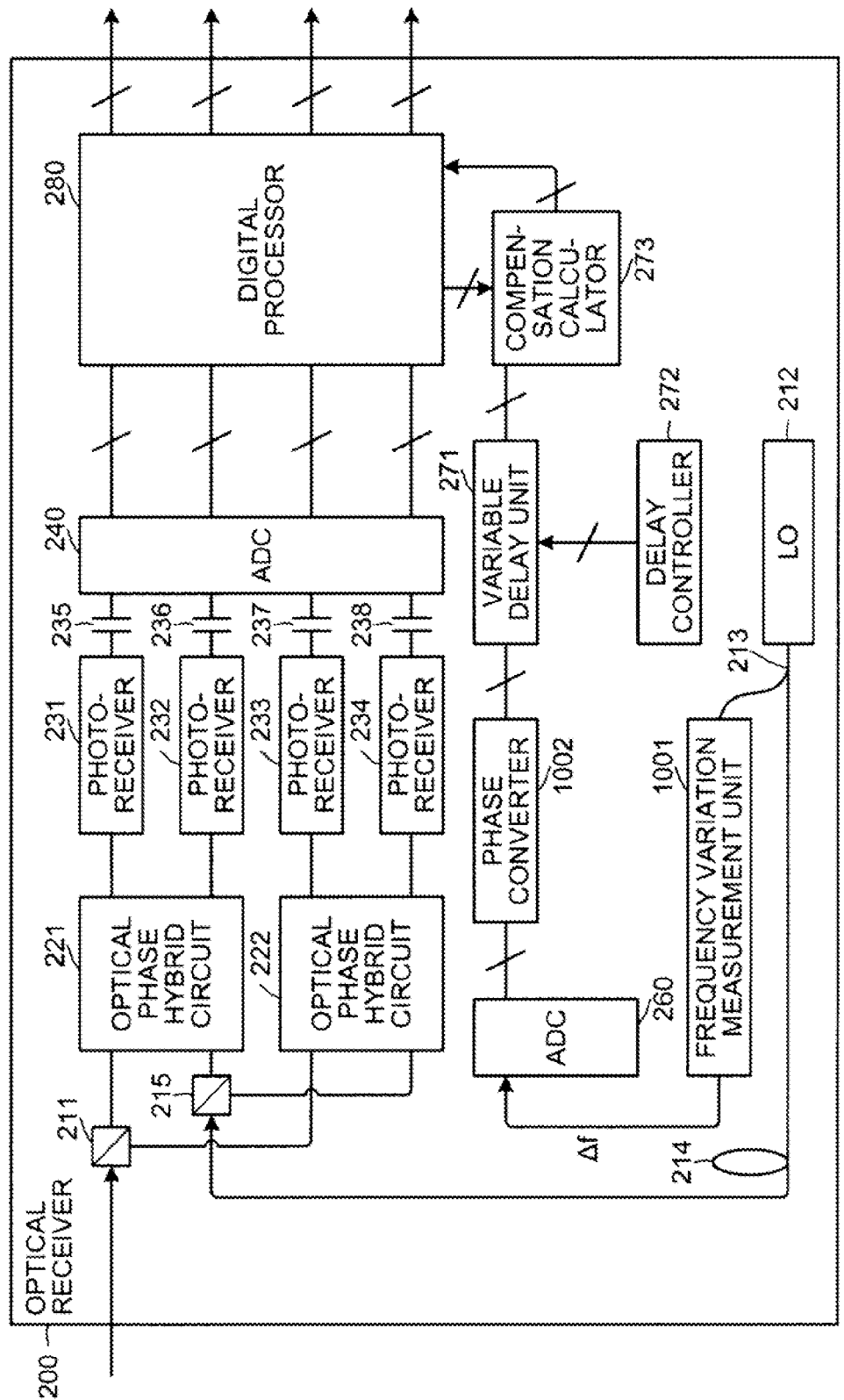

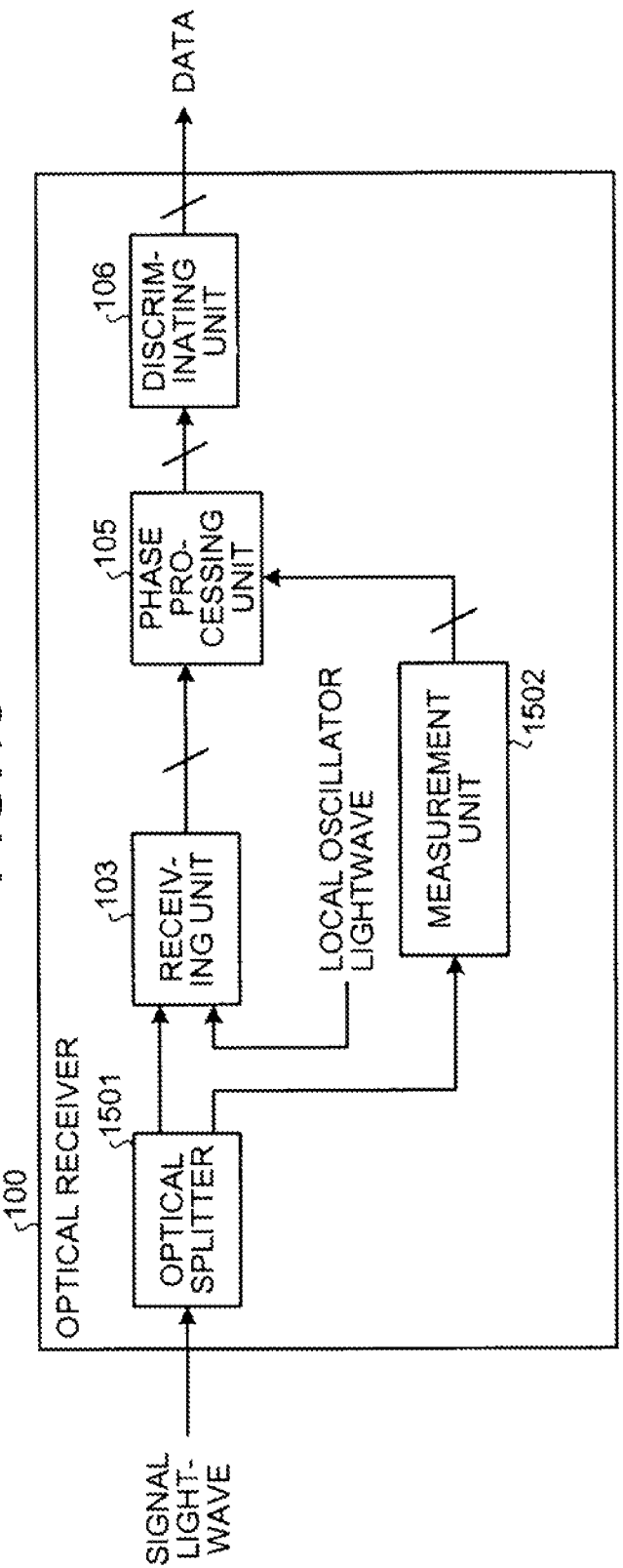

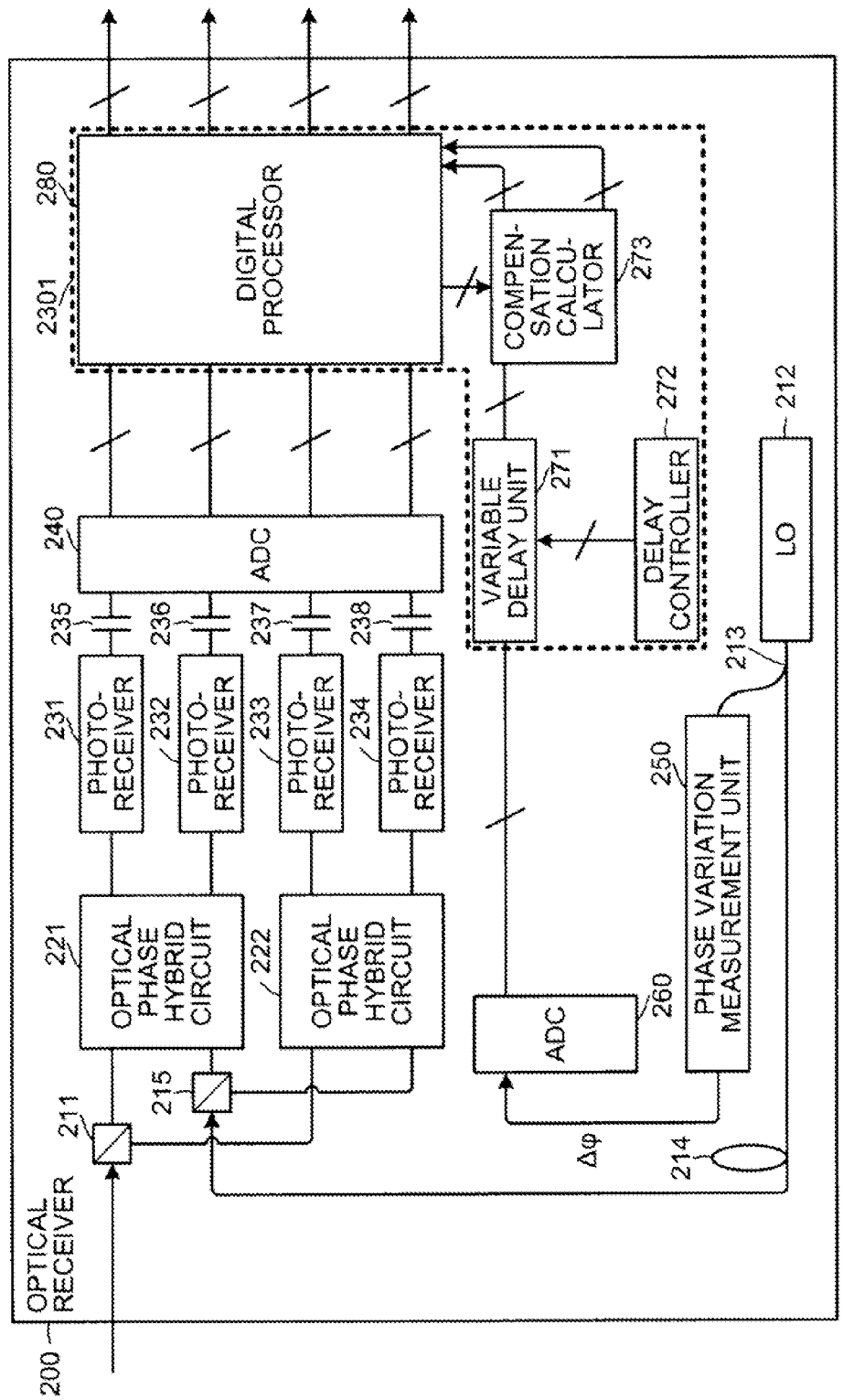

OPTICAL RECEIVER, SIGNAL PROCESSOR, AND OPTICAL RECEIVING METHOD

CROSS REFERENCE TO RELATED APPLICATIONS

This application is based upon and claims the benefit of priority of the prior Japanese Patent Application No. 2011-037685, filed on Feb. 23, 2011, the entire contents of which are incorporated herein by reference.

FIELD

The embodiments discussed herein are related to an optical receiver, a signal processor, and an optical receiving method.

BACKGROUND

By parallel implementation, digital signal processing semiconductor devices have extended the operating speed to tens of gigabit per second. With this development, a digital coherent optical communication that enables multilevel transmission using the digital signal processing is studied as a long haul and large capacity communication technique and is making progress.

In the digital coherent optical communication, both intensity and phase of an optical signal is manipulated with a digital circuit. As a result, the chromatic dispersion and the fast-fluctuating polarization mode dispersion (PMD) in an optical fiber are easily compensated, and high sensitivity due to the coherent receiving is also expected.

A receiver of multilevel coherent optical transport system with the digital processing disclosed by "Digital Coherent Receiver Technology for 100-Gbps Optical Transport Systems" (Rasumussen, Hoshida, Nakajima, FUJITSU. 60, 5, P. 476-483, September, 2009) is made up of, in most part, a digital circuit that estimates a phase variation of an incoming lightwave and a local oscillator lightwave of the receiver after the superimposed incoming lightwave and local oscillator lightwave is converted into an electrical signal and into a digital signal.

However, very low phase-noise lasers required for optical transmitters and local oscillators of an optical receivers in multilevel coherent optical communication such as 16 quadrature amplitude modulation (QAM) and 64QAM that is expected to be in practical use in the future. This demand calls for a laser having a narrower spectral linewidth by the aid of, for example, the quadrature phase shift keying (QPSK). In order to fulfill this requirement only by laser property improvement, the laser cavity length becomes longer and the laser becomes larger and more expensive. Thus the realization by an actual communication device is considered to be difficult.

The digital coherent receiver compensates the chromatic dispersion for a digital signal. Incoming light undergoes chromatic dispersion in an optical fiber and dispersion compensation at a digital circuit of a receiver. Thus the degradation due to the chromatic dispersion tends to zero. On the other hand, the local oscillator lightwave from the receiver undergoes only the dispersion compensation at the digital circuit of the receiver since the local oscillator lightwave does not travel through the optical fiber. Thus, when the local oscillator lightwave includes significant phase noise, the degradation of waveform emerges in proportion to the breadth of wavelength of the local oscillator lightwave.

"Phase Noise Cancellation in Coherent Optical Receivers by Digital Coherence Enhancement" (M. Secondini et al., ECOC, September, 2010, P 4. 17) discloses a digital coherent receiver that measures the phase variation of a local oscillator lightwave that has not been superimposed on a signal lightwave, and based on the measurement, conducts phase rotation processing at a digital circuit. Other related documents are, for example, "Coherent optical OFDM: has its time come? [Invited]" (William Shieh, Xingwen Yi, Yiran Ma, and Qi Yang, Journal of Optical Networking, Vol. 7, Issue 3, pp. 234-255, 2008) and "Local oscillator phase noise induced penalties in optical coherent detection systems using electronic chromatic dispersion compensation", (C. Xie, OFC2009 OMT4, 2009).

However, the above-noted documents possess a problem of large power consumption of the phase rotation processing. Nyquist theorem indicates that in order to reconstruct data from an incoming lightwave that has underwent the chromatic dispersion on the path and has large variation within one symbol, it is necessary to process signals twice as fast as the symbol rate. For a disturbed wave form due to the chromatic dispersion, the phase rotation processing is performed at a higher rate and thus more parallel circuits need be combined, resulting in more power consumption in the digital signal processing circuit.

Furthermore, compensation of the phase variation (frequency variation) exceeding $2\pi$ according to the document of Secondini et al. requires a manipulation of a phase term in the trigonometric function instead of a phase rotation matrix operation. Even the signal processing for a non-polarization-multiplexed signal becomes complicated. In addition, when a polarization multiplexed optical signal is transmitted, the phase variation (frequency variation) beyond $2\pi$ can be compensated, in principle, only after two polarized signal are separated, which has not been mentioned in the document of Secondini et al.

SUMMARY

According to an aspect of an embodiment, an optical receiver includes a splitter that splits a local oscillator lightwave into a first local oscillator lightwave and a second local oscillator lightwave; a measurement unit that measures phase variation of the first local oscillator lightwave; a receiving unit that receives a signal lightwave and the second local oscillator lightwave and converts the signal lightwave and the second local oscillator lightwave into a digital signal; a dispersion compensator that reduces chromatic dispersion of the digital signal; a phase processing unit that rotates phase of the dispersion-reduced signal based on the phase variation; and a discriminating unit that discriminates the phase-rotated signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram depicting an optical receiver according to a first embodiment.

FIG. 2A is a diagram depicting an optical receiver according to a first example.

FIG. 2B is a diagram depicting an example of a digital processor in FIG. 2A.

FIG. 3 is a diagram depicting an example of an optical phase hybrid interferometer of FIG. 2A.

FIG. 4 is a diagram depicting a phase variation measurement unit of FIG. 2A.

FIG. 5 is a diagram depicting a variable delay unit of FIG. 2A.

FIG. 7A is a graph depicting an example of frequency variation of the local oscillator lightwave.

FIG. 7B is a graph depicting an example of a time delay according to the frequency.

FIG. 7C is a graph depicting an example of output power when a time delay is given to a frequency signal.

FIG. 8 is a diagram depicting an example of a process at an amplitude adjustment unit and a phase rotation unit of FIG. 2B.

FIG. 9 is a diagram depicting a digital processor of a second example of an optical receiver according to the first embodiment.

FIG. 11B is a diagram depicting an example of a digital processor of FIG. 11A.

FIG. 14 is a diagram depicting a fifth example of the optical receiver according to the first embodiment.

FIG. 15 is a diagram depicting an optical receiver of the second embodiment.

FIGS. 23, 24, 25, 26, and 27 are diagrams depicting an example of a configuration mounted on a semiconductor integrated circuit.

DESCRIPTION OF EMBODIMENT(S)

Figure 6:
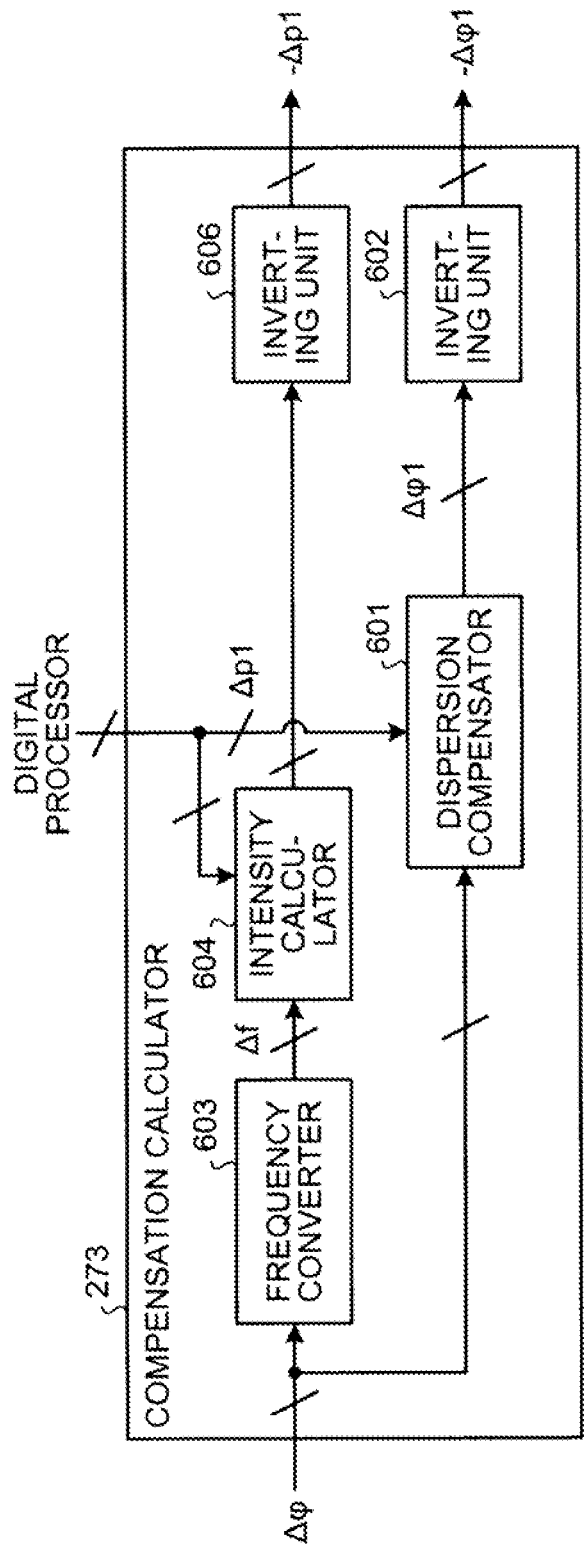
FIG. 6 is a diagram depicting an example of a compensation calculator of FIG. 2A.

Preferred embodiments of the present invention will be explained with reference to the accompanying drawings.

FIG. 1 is a diagram depicting an optical receiver according to a first embodiment. As depicted in FIG. 1, an optical receiver 100 according to the first embodiment includes an optical splitter 101, a measurement unit 102, a receiving unit 103 that mixes an signal lightwave and a local oscillator lightwave into an optical signal, converts the optical signal into an electrical signal, and creates a digital signal having a sufficient resolution, a dispersion compensator 104, a phase processing unit 105, and a discriminating unit 106. The local oscillator lightwave (local light) is input into the optical splitter 101. The local oscillator lightwave may come from a source inside the optical receiver 100 or a source of a receiver in which the optical receiver 100 has been installed.

The optical splitter 101 splits the local oscillator lightwave and outputs the split local oscillator lightwaves to the measurement unit 102 and the receiving unit 103 respectively. The measurement unit 102 measures a phase variation of the local oscillator lightwave output from the optical splitter 101. The phase variation is, for example, a variation of phase per unit time. The measurement unit 102 outputs the measured phase variation to the phase processing unit 105.

The receiving unit 103 receives the signal lightwave that is received by the optical receiver 100. The receiving unit 103 is an optical front end that receives the incoming signal lightwave with the local oscillator lightwave output from the optical splitter 101. More specifically, the receiving unit 103 receives and mixes the signal lightwave and the local oscillator lightwave, and converts the mixed signal into a digital signal. The receiving unit 103 outputs the digital signal to the dispersion compensator 104.

The dispersion compensator 104 compensates chromatic dispersion of the signal output from the dispersion compensator 104. More specifically, the dispersion compensator 104 compensates the chromatic dispersion by providing the signal from the receiving unit 103 with a given chromatic dispersion property (light transmission property). The dispersion compensator 104 may simply reduce the chromatic dispersion instead of completely cancelling the chromatic dispersion. The dispersion compensator 104 outputs the compensated signal to the phase processing unit 105.

The phase processing unit 105 rotates the phase of the signal output from the dispersion compensator 104 based on the phase variation. In this way, in a phase difference between the signal lightwave and the local oscillator lightwave included in the signal from the dispersion compensator 104, a phase difference stemming from the phase variation of the local oscillator lightwave can be compensated. The phase processing unit 105 may simply reduce the phase difference instead of completely cancelling the phase difference.

The phase variation on which the phase rotation of the phase processing unit 105 depends also reflects the dispersion compensation at the dispersion compensator 104. In this way, the degradation of waveform of the local oscillator lightwave component in the signal from the dispersion compensator, caused by the dispersion compensation at the dispersion compensator 104, is compensated (lessened). Thus, in a phase difference between the signal lightwave and the local oscillator lightwave in the signal, a phase difference stemming from the phase variation of the local oscillator lightwave can be compensated (lessened) more accurately.

The phase processing unit 105 outputs the signal whose phase has been rotated to the discriminating unit 106. The discriminating unit 106 discriminates a signal from among signals output from the phase processing unit 105. For instance, the discriminating unit 106 discriminates a signal by demodulating a combination of phase and amplitude of the signal. The discriminating unit 106 outputs the signal.

According to the optical receiver 100 of FIG. 1, a phase variation of a local oscillator lightwave alone is measured and the phase rotation processing based on the measurement can be performed. As a result, a phase difference between the signal lightwave and the local oscillator lightwave that stems from the phase variation of the local oscillator lightwave can be compensated. Furthermore, the phase rotation processing on the basis of the measurement disposed after the chromatic dispersion compensation processing makes a variation within one symbol negligible so that the maximum frequency of a signal to be given to the phase rotation processing is cut into half. This means that in light of the Nyquist sampling theorem (the sampling theorem), even a slower phase rotation processing can compensate the phase difference between the signal lightwave and the local oscillator lightwave that stems from the phase variation of the local oscillator lightwave. As a result, electrical power consumed in the digital processing can be reduced.

The optical receiver 100 conducts phase rotation processing based on the phase variation of the local oscillator lightwave that reflects the chromatic dispersion compensation. In this way, the degradation of waveform of the local oscillator lightwave component caused by the dispersion compensation is compensated. Thus, even if the phase rotation processing is placed after the chromatic dispersion compensation processing, the phase difference due to the phase variation of the local oscillator lightwave is accurately compensated.

FIG. 2A is a diagram depicting an optical receiver according to a first example. FIG. 2B is a diagram depicting an example of a digital processor in FIG. 2A. An optical receiver 200 in FIGS. 2A and 2B is a first example of the optical receiver 100 of FIG. 1. The optical receiver 200 is a digital coherent receiver. It is assumed here that an signal lightwave input into the optical receiver 200 includes polarization multiplexed, multi-phase modulated signals.

As depicted in FIG. 2A, the optical receiver 200 includes polarizing beam splitters 211, 215, a local oscillator (LO) 212, an optical splitter 213, a delay unit 214, optical phase hybrid interferometers 221, 222, photoreceivers 231-234, condensers 235-238, an analog/digital converter (ADC) 240, a phase variation measurement unit 250, an ADC 260, a variable delay unit 271, a delay controller 272, a compensation calculator 273, and a digital signal processing unit (DSPU) 280. The DSPU 280 is built with a semiconductor integrated circuit such as an application specific integrated circuit (ASIC), a field-programmable gate array (FPGA), and a digital signal processor (DSP). The ADC 240 may be built into a semiconductor integrated circuit together with the DSPU 280.

The optical splitter 101 in FIG. 1 is realized by, for example, the optical splitter 213. The measurement unit 102 in FIG. 1 is realized by, for example, the phase variation measurement unit 250. The receiving unit 103 in FIG. 1 is realized by, for example, the optical phase hybrid interferometers 221, 222, the photoreceivers 231-234, and the ADC 240.

The polarizing beam splitter 211 splits the signal lightwave according to the polarization. For example, the polarizing beam splitter 211 splits the signal lightwave into x-polarized and y-polarized lights. The polarizing beam splitter 211 outputs the x-polarized light into the optical phase hybrid interferometer 221 and the y-polarized light into the optical phase hybrid interferometer 222.

The LO 212 outputs a local oscillator lightwave into the optical splitter 213. The wavelength of the pump light from the LO 212 is almost equal to the signal lightwave received by the optical receiver 200. The optical splitter 213 splits the local oscillator lightwave. The optical splitter 213 outputs lights into the delay unit 214 and the phase variation measurement unit 250. The delay unit 214 delays the local oscillator lightwave output from the optical splitter 213 and outputs the delayed local oscillator lightwave into the polarizing beam splitter 215.

The polarizing beam splitter 215 splits the local oscillator lightwave output from the optical splitter 213 according to the polarization. The polarizing beam splitter 215 splits the local oscillator lightwave into x-polarized and y-polarized lights. The polarizing beam splitter 215 outputs the x-polarized light into the optical phase hybrid interferometer 221 and the y-polarized light into the optical phase hybrid interferometer 222.

The optical phase hybrid interferometer 221 performs coherent detection based on the x-polarized signal lightwave from the polarizing beam splitter 211 and the x-polarized local oscillator lightwave from the LO 212. More specifically, the optical phase hybrid interferometer 221 introduces two or more phase differences to the signal lightwave and the local oscillator lightwave and mixes the signal lightwave and the local oscillator lightwave, whereby outputting a signal lightwave presenting the amplitude and the phase of an I-channel and an signal lightwave presenting the amplitude and the phase of a Q-channel (see FIG. 3).

The optical phase hybrid interferometer 222 performs coherent detection based on the y-polarized signal lightwave from the polarizing beam splitter 211 and the x-polarized local oscillator lightwave from the LO 212. More specifically, the optical phase hybrid interferometer 222 introduces two or more phase differences to the signal lightwave and the local oscillator lightwave and mixes the signal lightwave and the local oscillator lightwave, whereby outputting a signal lightwave presenting the amplitude and the phase of an I-channel and an signal lightwave presenting the amplitude and the phase of a Q-channel (see FIG. 3).

The photoreceiver 231 receives the I-channel signal lightwave from the optical phase hybrid interferometer 221. The photoreceiver 232 receives the Q-channel signal lightwave from the optical phase hybrid interferometer 221. The photoreceiver 233 receives the I-channel signal lightwave from the optical phase hybrid interferometer 222. The photoreceiver 234 receives the Q-channel signal lightwave from the optical phase hybrid interferometer 222.

The photoreceivers 231-234 amplify signals (electrical signals) corresponding to the received signal lightwave, keeping approximately linear input-output property, and outputs the amplified signals into the ADC 240 via the condensers 235-238. The ADC 240 converts the signals into digital signals the number of which gives a sufficient voltage resolution for subsequent digital processing and outputs parallel digital signals to the digital processor 280.

The phase variation measurement unit 250 measures phase variation $\Delta\phi$ of the local oscillator lightwave output from the optical splitter 213 (see FIG. 4). The phase variation $\Delta\phi$ represents, for example, how much the phase changes per unit time (one time slot for example). The phase variation measurement unit 250 outputs a phase variation signal carrying information of the phase variation $\Delta\phi$ into the ADC 260.

The ADC 260 converts the phase variation signal into digital signals the number of which gives a sufficient voltage resolution for subsequent digital processing and outputs parallel digital signals into the variable delay unit 271. The variable delay unit 271 delays a phase variation signal and outputs the delayed signal into the compensation calculator 273 (see for example FIG. 5). The amount of delay is controlled by the delay controller 272.

The compensation calculator 273 receives a dispersion compensation parameter from the digital processor 280 and the phase variation signal ($\Delta\phi$) from the variable delay unit 271. The dispersion compensation parameter is information that represents a predetermined dispersion property given to a signal at the dispersion compensation processing in the digital processor 280. The compensation calculator 273 calculates the amount of compensation used at the digital processor 280 based on the dispersion compensation parameter and the phase variation signal.

More specifically, the compensation calculator 273 calculates the compensation of amplitude used at amplitude adjustment in the digital processor 280 (see FIG. 6). The compensation calculator 273 also calculates the compensation of phase used at the phase rotation processing in the digital processor 280 (see FIG. 6). The compensation calculator 273 outputs the compensation of amplitude and the compensation of phase into the digital processor 280.

As depicted in FIG. 2B, the digital processor 280 is a signal processing apparatus that includes a chromatic dispersion compensator 281, an adaptive equalizer 282, a decimation unit 283, an amplitude adjustment unit 284, a phase rotation unit 285, a frequency/phase processing unit 286, and a demodulator 287. The dispersion compensator 104 in FIG. 1 is realized by, for example, the chromatic dispersion compensator 281. The phase processing unit 105 in FIG. 1 is realized by, for example, the phase rotation unit 285. The discriminating unit 106 is realized by, for example, the demodulator 287.

The chromatic dispersion compensator 281 receives a signal from the ADC 240. The chromatic dispersion compensator 281 compensates the chromatic dispersion by providing an incoming signal with a given chromatic dispersion property. The given chromatic dispersion property is, for example, the inverse of the chromatic dispersion which the signal lightwave received by the optical receiver 200 has undergone on the transmission path. In this way, the chromatic dispersion of each signal can be compensated. The chromatic dispersion compensator 281 compensates the chromatic dispersion and outputs a signal into the adaptive equalizer 282. The chromatic dispersion compensator 281 outputs into the compensation calculator 273 a dispersion compensation parameter that represents the chromatic dispersion property given to each signal lightwave.

The adaptive equalizer 282 compensates waveform distortion of the signals from the chromatic dispersion compensator 281 according to the adaptive equalization technique. More specifically, the adaptive equalizer 282 cancels crosstalk of the x-polarization component and the y-polarization component of fast fluctuating signals over the transmission path and compensates (lessens) a waveform distortion component such as PMD. The adaptive equalizer 282 outputs the signals to the decimation unit 283.

The decimation unit 283 decimates, at a given interval, the signal output from the adaptive equalizer 232, downsampling the signals from the adaptive equalizer 232. As a result, the rate of subsequent signal processing is reduced. The decimation unit 283 outputs the downsampled signal to the amplitude adjustment unit 284.

The amplitude adjustment unit (amplitude processing unit) 284 adjusts amplitude of the signal output from the decimation unit 283 based on an amplitude compensation value output from the compensation calculator 273 (see FIG. 8). The amplitude adjustment unit 284 outputs the amplitude-adjusted signal into the phase rotation unit 285. The phase rotation unit 285 rotates phase of the signal output from the amplitude adjustment unit 284 based on a phase compensation value output from the compensation calculator 273 (see FIG. 8). The phase rotation unit 285 outputs the phase-rotated signal into the frequency/phase processing unit 286.

The frequency/phase processing unit 286 compensates a frequency deviation and a phase deviation of the signal output from the phase rotation unit 285. More specifically, the frequency/phase processing unit 286 estimates the frequency deviation of each signal and provides each signal with an inverse property of the estimated frequency deviation, thereby compensating the frequency deviation of each signal. The frequency/phase processing unit 286 may reduce the frequency deviation sufficiently instead of completely cancelling the frequency deviation.

The frequency/phase processing unit 286 also estimates and compensates the phase deviation between the local oscillator lightwave from the LO 212 and the signal from the phase rotation unit 285. The frequency/phase processing unit 286 may simply reduce the phase deviation instead of completely cancelling the phase deviation. The frequency/phase processing unit 286 outputs the frequency deviation- and phase deviation-compensated signal into the demodulator 287.

The demodulator 287 demodulates (discriminates) the signal output from the frequency/phase processing unit 286. At this point, data in the I- and Q-channel of the x-polarization and data in the I- and Q-channel of y-polarization are acquired. The demodulator 287 outputs the data.

In FIGS. 2A and 2B, the delay controller 272 controls a delay time the variable delay unit 271 imposes on a signal. In this way, the arrival of one of split local oscillator lightwaves at the amplitude adjustment unit 284 and the phase rotation unit 285 undergoing the conversion to the compensation value synchronizes with the arrival of the other local oscillator lightwave at the amplitude adjustment unit 284 and the phase rotation unit 285 undergoing the mixing with the signal lightwave. The delay unit 214 may be omitted.

FIG. 3 is a diagram depicting an example of the optical phase hybrid interferometer of FIG. 2A. An optical phase hybrid interferometer 300 depicted in FIG. 3 is an example of the optical phase hybrid interferometer 221, 222 of FIG. 2A. The optical phase hybrid interferometer 300 includes optical splitters 311, 312, a phase shift unit 320, and optical combiners 331, 332. Each of the optical combiner 331, 332 may be made of an optical coupler having two inputs and two outputs. In this case, a balanced PD, for example, is used as a photoelectric conversion element in a later stage.

The optical splitter 311 splits the signal lightwave input into the optical phase hybrid interferometer 300 and outputs each signal lightwave into the optical combiner 331 and the optical combiner 332. The optical splitter 312 splits the local oscillator lightwave input into the optical phase hybrid interferometer 300 and outputs each local oscillator lightwave into the optical combiner 331 and the phase shift unit 320. The phase shift unit 320 shifts the phase of the local oscillator lightwave output from the optical splitter 312 by 90 degrees ($\pi/2$). The phase shift unit 320 outputs the phase-shifted local oscillator lightwave into the optical combiner 332.

The optical combiner 331 superimposes the signal lightwave from the optical splitter 311 and the local oscillator lightwave from the optical splitter 312 and outputs the outcome as the signal lightwave of the I-channel. The optical combiner 332 superimposes the signal lightwave from the optical splitter 311 and the local oscillator lightwave from the phase shift unit 320 and outputs the outcome as the signal lightwave of the Q-channel. In this way, the signal lightwave and the local oscillator lightwave are mixed so that the signal lightwave of the I-channel and the Q-channel are output.

FIG. 4 is a diagram depicting the phase variation measurement unit of FIG. 2A. A phase variation measurement unit 250 of FIG. 4 is an example of the phase variation measurement unit 250 of FIG. 2A. As depicted in FIG. 4, the phase variation measurement unit 250 is a delayed self-homodyne detector that includes an optical coupler 401, asymmetric Mach-Zehnder interferometers 410, 420, bias circuits 431, 432, balanced photo detectors 441, 442, amplifiers 451, 452, and a signal processing circuit 460.

The local oscillator lightwave the phase variation measurement unit 250 receives is input into the optical coupler 401. The optical coupler 401 is a 1×2 optical coupler that splits the incident local oscillator lightwave and outputs each local oscillator lightwave into the asymmetric Mach-Zehnder interferometers 410, 420.

The asymmetric Mach-Zehnder interferometer 410 includes an optical coupler 411, a delay unit 412, a phase adjustment unit 413, and an optical coupler 414. The optical coupler 411 is a 2×2 optical coupler that splits the incident local oscillator lightwave from the optical coupler 401 and outputs each local oscillator lightwave into the delay unit 412 and the phase adjustment unit 413. The delay unit 412 delays the local oscillator lightwave from the optical coupler 411 by Δt and outputs the delayed local oscillator lightwave into the optical coupler 414. The phase adjustment unit 413 delays the incident local oscillator lightwave from the optical coupler 411 by π/4 and outputs the delayed local oscillator lightwave into the optical coupler 414. The optical coupler 414 is a 2×2 optical coupler that mixes local oscillator lightwaves from the delay unit 412 and the phase adjustment unit 413 so that the local oscillator lightwaves interfere and outputs the mixed light into the balanced photo detector 441.

The asymmetric Mach-Zehnder interferometer 420 includes an optical coupler 421, a delay unit 422, a phase adjustment unit 423, and an optical coupler 424. The optical coupler 421 is a 2×2 optical coupler that splits the incident local oscillator lightwave from the optical coupler 401 and outputs each local oscillator lightwave into the delay unit 422 and the phase adjustment unit 423. The delay unit 422 delays the local oscillator lightwave from the optical coupler 421 by Δt and outputs the delayed local oscillator lightwave into the optical coupler 424. The phase adjustment unit 423 delays the incident local oscillator lightwave from the optical coupler 421 by −π/4 and outputs the delayed local oscillator lightwave into the optical coupler 424. The optical coupler 424 is a 2×2 optical coupler that mixes local oscillator lightwaves from the delay unit 422 and the phase adjustment unit 423 so that the local oscillator lightwaves interfere and outputs the mixed light into the balanced photo detector 442.

The bias circuit 431 provides the biasing for the balanced photo detector 441. The balanced photo detector 441 is a balance-type photo detector that receives each lightwave from the asymmetric Mach-Zehnder interferometer 410 using the basing provided by the bias circuit 431. The balanced photo detector 441 outputs a signal into the signal processing circuit 460 through the amplifier 451. The balanced photo detector 442 is a balance-type photo detector that receives each lightwave from the asymmetric Mach-Zehnder interferometer 420 based the basing provided by the bias circuit 432. The balanced photo detector 442 outputs a signal into the signal processing circuit 460 through the amplifier 452.

The signal processing circuit 460 calculates phase variation Δϕ of the local oscillator lightwave fed to the phase variation measurement unit 250 based on the signals output from the balanced photo detectors 441, 442. Since there is a phase difference of π/4 between the asymmetric Mach-Zehnder interferometers 410, 420, the signals $P_{mz1}$ and $P_{mz2}$ from the balanced photo detectors 441, 442 are expressed for example by the following Equation (1):

$$Pmz1 = k \times \cos(\theta)$$

$$Pmz2 = k \times \sin(\theta) \quad (1)$$

In Equation (1), θ denotes the phase of local oscillator lightwave fed to the signal processing circuit 460 and k denotes the constant of proportionality. Using Equation (1), θ is expressed for example as follows.

$\theta = \cos^{-1}(Pmz1/k)$, when Pmz1≥0 and Pmz2≥0
$\theta = \pi/2 + \cos^{-1}(Pmz1/k)$, when Pmz1<0 and Pmz2≥0
$\theta = \pi + \cos^{-1}(Pmz1/k)$, when Pmz1<0 and Pmz2<0
$\theta = 3\pi/2 + \cos^{-1}(Pmz1/k)$, when Pmz1≥0 and Pmz2<0

Phase variation Δϕ of local oscillator lightwave is, for example, the phase difference between $P_{mz1}$ and $P_{mz2}$ when the time difference between two paths of the asymmetric Mach-Zehnder interferometer 410, 420 is Δt. Therefore, the signal processing circuit 460 calculates, based on $P_{mz1}$ and $P_{mz2}$, phase variation Δϕ as below. The signal processing circuit 460 outputs the phase variation signal that indicates phase variation Δϕ.

As for phase variation Δϕ that exceeds 2π, since it is known that such phase variation can be represented by a Wiener process model that describes continuously changing phase noise of semiconductor laser, the characteristic of the continuous change of Δϕ enables the measurement of Δθ beyond 2π.

$\Delta\phi = \cos^{-1}(Pmz1/k)$, when Pmz1≥0 and Pmz2≥0
$\Delta\phi = \pi/2 + \cos^{-1}(Pmz1/k)$, when Pmz1<0 and Pmz2≥0
$\Delta\phi = \pi + \cos^{-1}(Pmz1/k)$, when Pmz1<0 and Pmz2<0
$\Delta\phi = 3\pi/2 + \cos^{-1}(Pmz1/k)$, when Pmz1≥0 and Pmz2<0

FIG. 5 is a diagram depicting the variable delay unit of FIG. 2A. The variable delay unit 271 of FIG. 5 is an example of the variable delay unit 271 of FIG. 2A. As depicted in FIG. 5, the variable delay unit 271 includes delay elements 511-516 and a selector 520. The delay elements 511-516 are connected in series. A signal input into the variable delay unit 271 is input into the delay element 511 and the selector 520.

The delay element 511 delays a signal and outputs the delayed signal into the delay element 512 and the selector 520. The delay element 512 delays the incoming signal and outputs the delayed signal into the delay element 513 and the selector 520. The delay element 513 delays the incoming signal and outputs the delayed signal into the delay element 514 and the selector 520.

The delay element 514 delays the incoming signal and outputs the delayed signal into the delay element 515 and the selector 520. The delay element 516 delays the incoming signal and outputs the delayed signal into the selector 520.

The selector 520 selects a signal input into the selector 520 under the control of the delay controller 272 and outputs the selected signal. In this way, a signal input into the variable delay unit 271 is given a variable delay time.

FIG. 6 is a diagram depicting an example of the compensation calculator of FIG. 2A. With reference to FIG. 2, like parts are given like reference numerals and the explanation thereof will be omitted. As depicted in FIG. 6, the compensation calculator 273 includes a dispersion compensator 601, an inverting unit 602, a frequency converter 603, an intensity calculator 604, and a inverting unit 606. A phase variation signal Δϕ received by the compensation calculator 273 is input into the dispersion compensator 601 and the frequency converter 603.

The dispersion compensator 601 compensates for dispersion of the phase variation signal θ according to the dispersion compensation parameter output from the digital processor 280. The dispersion compensator 601 outputs the dispersion-compensated phase variation signal into the inverting unit 602. Thus, the phase variation signal output from the dispersion compensator 601 represents phase variation $\Delta\phi_1$ of the local oscillator lightwave affected by the dispersion compensation at the chromatic dispersion compensator 281 of the digital processor 280.

The inverting unit 602 inverts the phase variation signal $\Delta\phi_1$ output from the dispersion compensator 601 and outputs the inverted signal into the phase rotation unit 285 of the digital processor 280 as a phase compensation value. Thus, the phase compensation value from the inverting unit 602 represents phase variation $-\Delta\phi_1$, opposite phase compared to the phase variation $\Delta\phi_1$ of the local oscillator lightwave affected by the dispersion compensation at the chromatic dispersion compensator 281 of the digital processor 280.

The frequency converter 603 converts phase variation $\Delta\phi$ into frequency variation $\Delta f$. The frequency converter 603 and the phase variation measurement unit 205 form a frequency measurement unit that measures frequency variation of local oscillator lightwave. The frequency converter 603 outputs into the intensity calculator 604 a frequency variation signal that represents the frequency variation $\Delta f$.

The intensity calculator 604 calculates, based on the frequency variation $\Delta f$, intensity variation $\Delta p$ that occurs due to the frequency variation $\Delta f$ and the chromatic dispersion compensator 281. More specifically, the intensity calculator 604 calculates the intensity variation $\Delta p$ by adding, at each time slot, a time delay according to the frequency (see FIGS. 7A-7C). The time delay is determined by the chromatic dispersion. The intensity calculator 604 outputs an intensity variation signal that represents calculated intensity variation $\Delta p_1$ into the inverting unit 606.

The inverting unit 606 inverts the intensity variation signal $\Delta p_1$ output from the intensity calculator 604. The inverting unit 606 outputs the inverted intensity variation signal into the amplitude adjustment unit 284 of the digital processor 280 as an amplitude compensation value. Thus, the amplitude compensation value from the inverting unit 606 represents $-\Delta p_1$, opposite intensity variation compared to the intensity variation of the local oscillator lightwave affected by the dispersion compensation at the chromatic dispersion compensator 281 of the digital processor 280. The amplitude compensation value from the inverting unit 606 is expressed by, for example, Equation (2) below.

$$\text{amplitude compensation value} = \begin{pmatrix} a11 & a12 \\ a21 & a22 \end{pmatrix} \quad (2)$$

A finite impulse response (FIR) filter, realizing dispersion compensation in a time domain, may be applied to the dispersion compensator 601. Dispersion compensation in a frequency domain may be applied to the dispersion compensator 601 in a manner that a signal is converted to a frequency domain by the fast Fourier transform (FFT), undergoes a phase shift operation as needed, and is converted to a time domain by the inverse FFT (IFFT). The dispersion compensator 601 can be realized by a filter of a small-sized circuit because the frequency variation $\Delta f$ or the intensity variation $\Delta p$ is slower compared to the bit rate of the signal lightwave.

FIG. 7A is a graph depicting an example of the frequency variation of the local oscillator lightwave. In FIG. 7A, the horizontal axis denotes the time on the input side of the intensity calculator 604 and the vertical axis denotes the frequency of the local oscillator lightwave. Time slots T1-T10 denotes each time slot. Frequency variation signals 711-720 denotes frequency variation signal $\Delta\phi$ that is input into the intensity calculator 604 at each time slot T1-T10. A reference frequency 710 denotes a reference frequency for the local oscillator lightwave.

FIG. 7B is a graph depicting an example of a time delay according to the frequency. With reference to FIG. 7A, like parts are given like reference numerals and the explanation thereof will be omitted. The horizontal axis denotes the time on the output side of the intensity calculator 604. The intensity calculator 604 gives time delays 721-730 to the frequency variation signals 711-720 of FIG. 7A according to the frequency indicated by the frequency variation signals 711-720. In this figure, since the frequency variation signal 712 equals to the reference frequency 710, the time delay 722 for the frequency variation signal 712 is zero.

FIG. 7C is a graph depicting an example of output power when a time delay is given to a frequency signal. The length of a line segment in each time slot T1-T9 of FIG. 7B expresses relative power in each time slot. The vertical axis of FIG. 7C denotes the output power of the intensity calculator 604. As to parts of FIG. 7C identical to those of FIG. 2, the explanation thereof will be omitted. Power signals 731-739 denotes output power at each time slot T1-T9 when the time delays 721-730 are given to the frequency variation signals 711-720 (see FIG. 7B).

The intensity calculator 604 outputs the power signals 731-739 as the intensity variation signal representing the intensity variation $\Delta p$ of the local oscillator lightwave in the time slots T1-T9. As depicted in FIG. 7A-7C, the intensity calculator 604 calculates the intensity variation $\Delta p$ of the local oscillator lightwave by adding, at each time slot, a time delay of chromatic dispersion according to the frequency.

FIG. 8 is a diagram depicting an example of a process at the amplitude adjustment unit and the phase rotation unit of FIG. 2B. With reference to FIG. 2B, like parts are given like reference numerals and the explanation thereof will be omitted. Further, in the digital processor 280 of FIG. 8, elements other than the amplitude adjustment unit 284 and the phase rotation unit 285 are omitted. Each signal (I, Q) in FIG. 8 denotes signals of x-polarized I-, Q-channel received at the amplitude adjustment unit 284 or signals of y-polarized I-, Q-channel received at the amplitude adjustment unit 284. In FIG. 8, signals of I- and Q-channel are collectively expressed as one line. In an actual digital electronic circuit, even for either I- or Q-channel each is processed as parallel digital signals.

The amplitude adjustment unit 284 adjusts amplitude of a signal (I, Q) according to the amplitude compensation value of Equation (2) calculated by the compensation calculator 273. For instance, the amplitude adjustment unit 284 adjusts amplitude of each signal (I, Q) as indicated by Equation (3) below.

$$\begin{pmatrix} I1 \\ Q1 \end{pmatrix} = \begin{pmatrix} a11 & a12 \\ a21 & a22 \end{pmatrix} \begin{pmatrix} I \\ Q \end{pmatrix} \quad (3)$$

As described above, the amplitude compensation value of Equation (2) represents intensity variation $-\Delta p_1$, opposite to intensity variation $\Delta p_1$ of the local oscillator lightwave affected by the dispersion compensation at the chromatic dispersion compensator 281 of the digital processor 280. Therefore, the adjustment of amplitude of each signal (I, Q) according to Equation (3) enables compensation (reduction) of intensity variation of each signal (I, Q) that is caused by phase variation of the local oscillator lightwave. The amplitude adjustment unit 284 outputs the amplitude-adjusted signal (I1, Q1) into the phase rotation unit 285.

The phase rotation unit 285 rotates the phase of the signal (I1, Q1) by phase compensation value $-\Delta\phi_1$. For example, the phase rotation unit 285 rotates the phase of each signal (I1, Q1) according to Equation (4) below.

$$\begin{pmatrix} I2 \\ Q2 \end{pmatrix} = \begin{pmatrix} \cos(-\Delta\phi 1) & \sin(-\Delta\phi 1) \\ -\sin(-\Delta\phi 1) & \cos(-\Delta\phi 1) \end{pmatrix} \begin{pmatrix} I1 \\ Q1 \end{pmatrix} \quad (4)$$

As explained above, the phase compensation value $-\Delta\phi_1$ is the opposite phase compared to the phase variation $\Delta\phi_1$ of the local oscillator lightwave affected by the dispersion compensation at the chromatic dispersion compensator 281 of the digital processor 280. Therefore, the rotation of the phase of each signal (I1, Q1) according to Equation (4) compensates (reduces) the phase difference between the signal lightwave and the local oscillator lightwave of each signal (I1, Q1) that is caused by the phase variation of the local oscillator lightwave. The phase rotation unit 285 outputs the phase-rotated signal (I2, Q2).

FIG. 9 is a diagram depicting a digital processor of a second example of an optical receiver according to the first embodiment. With reference to FIG. 2B, like parts are given like reference numerals and the explanation thereof will be omitted. As depicted in FIG. 9, the phase rotation unit 285 may be disposed at a stage prior to the amplitude adjustment unit 284. Even in this case, the optical receiver 200 brings out the same advantage as the optical receiver 200 of FIGS. 2A and 2B.

Figure 10:
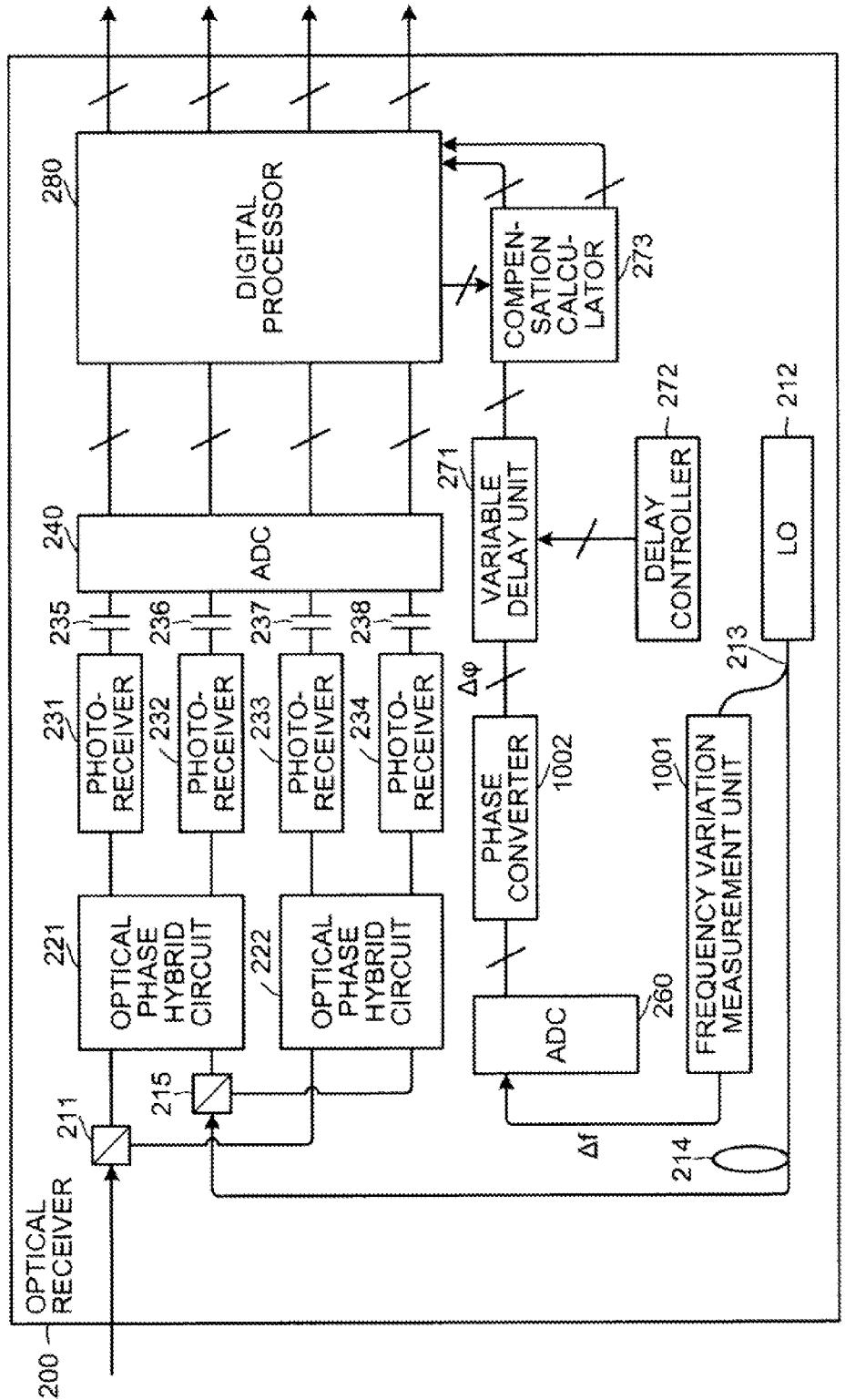
FIG. 10 is a diagram depicting a third example of an optical receiver according to the first embodiment.

FIG. 10 is a diagram depicting a third example of an optical receiver according to the first embodiment. With reference to FIG. 2A, like parts are given like reference numerals and the explanation thereof will be omitted. As depicted in FIG. 10, the optical receiver 200 may include a frequency variation measurement unit 1001 and a phase converter 1002 instead of the phase variation measurement unit 250 of FIG. 2A.

In this case, the measurement unit 102 of FIG. 1 is realized by, for example, the frequency variation measurement unit 1001 and the phase converter 1002. The optical splitter 213 outputs the local oscillator lightwave into the frequency variation measurement unit 1001 and the delay unit 214. The frequency variation measurement unit 1001 measures frequency variation $\Delta f$ of the local oscillator lightwave output from the optical splitter 213 and outputs into the ADC 260 a frequency variation signal that represents the frequency variation $\Delta f$.

The ADC 260 converts the frequency variation signal into a digital signal and outputs the digitally-converted frequency variation signal into the phase converter 1002. The phase converter 1002 converts the frequency variation $\Delta f$ indicated by the frequency variation signal into phase variation $\Delta\phi$. For example, the phase converter 1002 converts the frequency variation $\Delta f$ into the phase variation $\Delta\phi$ according to Equation (5) below.

$$\Delta\phi = \int \Delta f \, dt \quad (5)$$

As can be seen, the phase converter 1002 integrates the frequency variation $\Delta f$ over time and converts the frequency variation $\Delta f$ into the phase variation $\Delta\phi$. In this way, the phase variation $\Delta\phi$ of the local oscillator lightwave can be measured even without the phase variation measurement unit 250. The phase converter 1002 outputs a phase variation signal representing the phase variation $\Delta\phi$ into the variable delay unit 271. The variable delay unit 271 delays the phase variation signal.

In FIG. 10, the phase rotation unit 285 may be disposed at a stage prior to the amplitude adjustment unit 284 in a similar manner as the digital processor 280 of FIG. 9. Even in this case, the optical receiver 200 brings out the same advantage as the optical receiver 200 of FIG. 10.

Figure 11A:
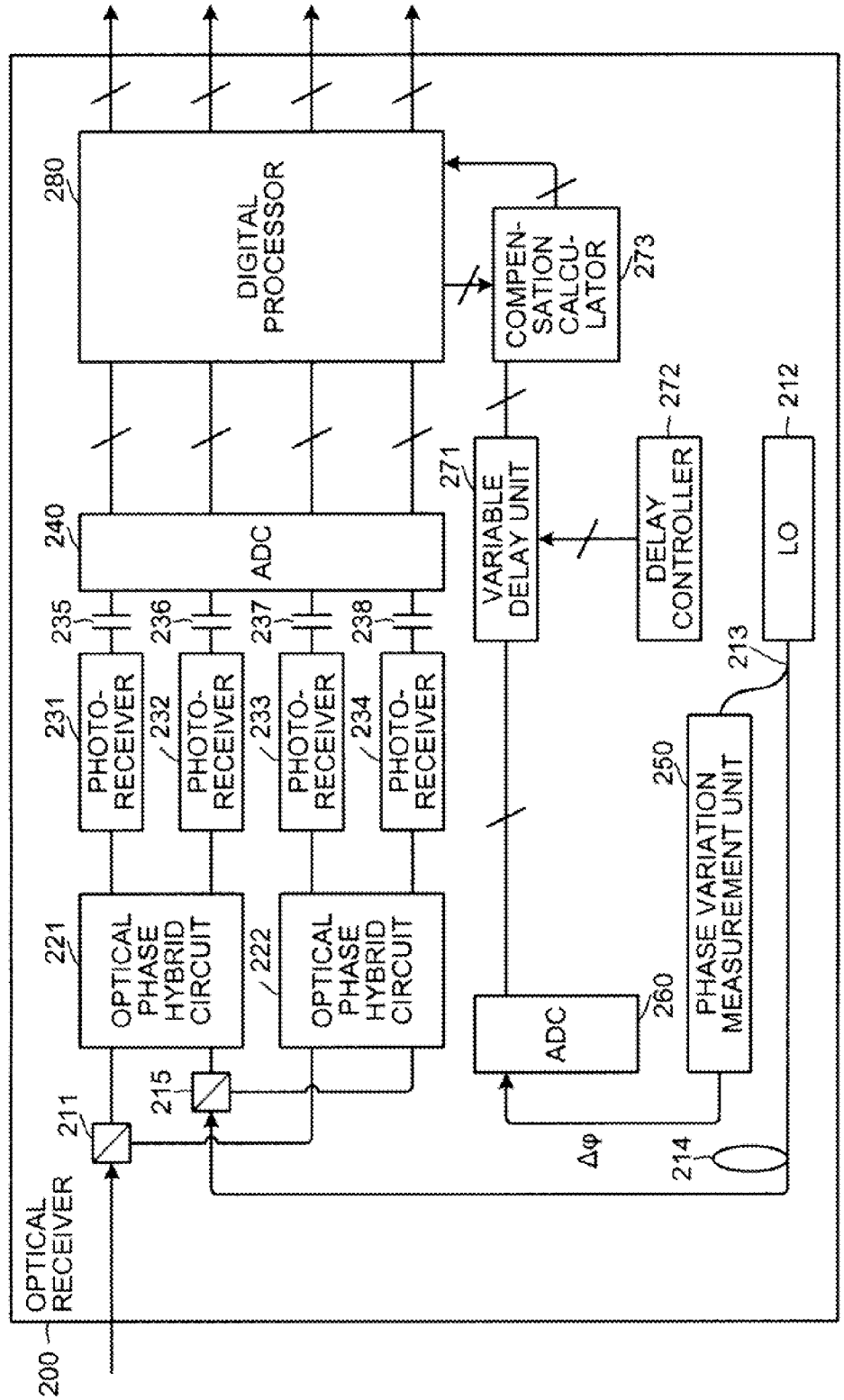
FIG. 11A is a diagram depicting a fourth example of the optical receiver according to the first embodiment.

FIG. 11A is a diagram depicting a fourth example of the optical receiver according to the first embodiment. FIG. 11B is a diagram depicting an example of a digital processor of FIG. 11A. With reference to FIGS. 2A and 2B, like parts are given like reference numerals and the explanation thereof will be omitted. As depicted in FIG. 11B, the optical receiver 200 may omit the amplitude adjustment unit 284 of FIG. 2B.

A function of the calculation of an amplitude compensation value may be removed from the compensation calculator 273 in a configuration of FIGS. 11A and 11B. When the frequency variation $\Delta f$ of the local oscillator lightwave is small, the phase variation within $2\pi$ can be compensated sufficiently at a stage after the chromatic dispersion compensator 281.

Figure 12:
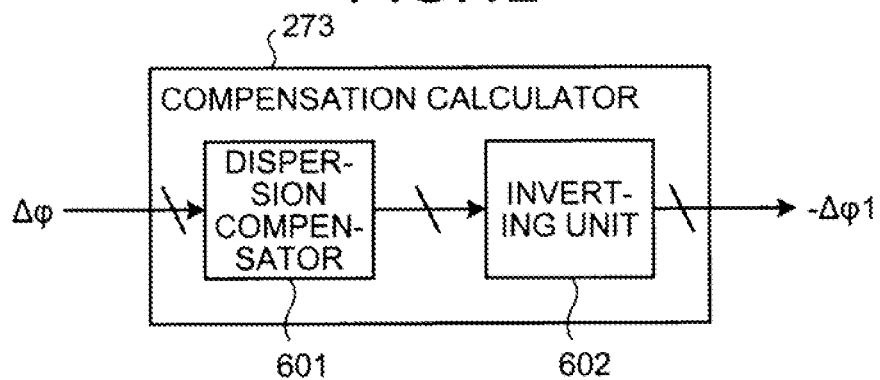
FIG. 12 is a diagram depicting an example of the compensation calculator of FIG. 11A.

FIG. 12 is a diagram depicting an example of the compensation calculator of FIG. 11A. With reference to FIG. 6, like parts are given like reference numerals and the explanation thereof will be omitted. As depicted in FIG. 12, the compensation calculator 273 of the optical receiver 200 in FIG. 11A may omit the frequency converter 603, the intensity calculator 604, and the inverting unit 606 of FIG. 6. The compensation calculator 273 calculates and outputs the phase compensation value $-\Delta\phi_1$ into the digital processor 280.

Figure 13:
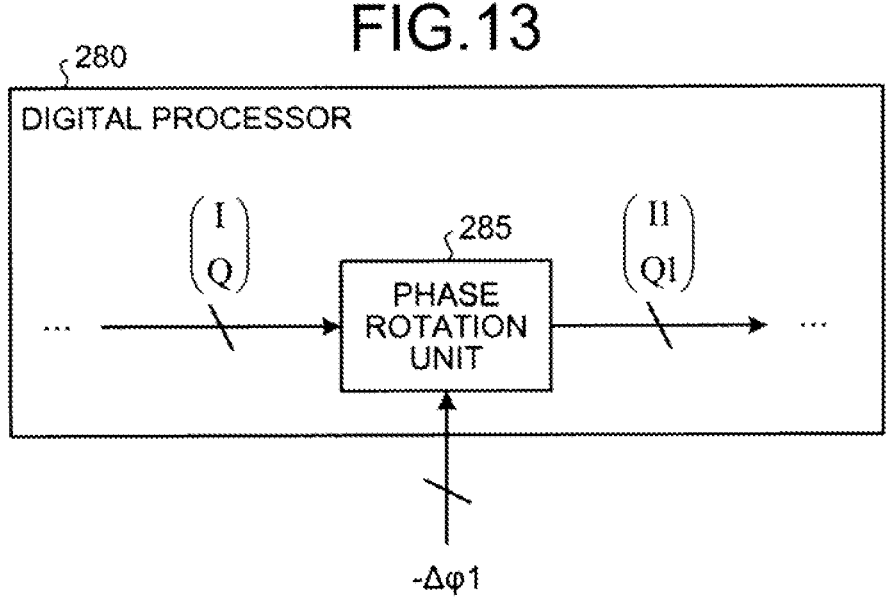
FIG. 13 is a diagram depicting an exemplary process conducted by the phase rotation unit of FIG. 11B.

FIG. 13 is a diagram depicting an exemplary process conducted by the phase rotation unit of FIG. 11B. With reference to FIG. 8, like parts are given like reference numerals and the explanation thereof will be omitted. A signal (I, Q) denotes x-polarized I- and Q-channel signals or y-polarized I- and Q-channel signals input into the phase rotation unit 285. In FIG. 13, I- and Q-channel signals are collectively expressed one line.

The phase rotation unit 285 rotates the phase of each signal (I, Q) by the phase compensation value $-\Delta\phi_1$. For example, the phase rotation unit 285 rotates the phase of each signal (I, Q) according to Equation (6) below. The phase rotation unit 285 outputs the phase-rotated signal (I1, Q1).

$$\begin{pmatrix} I1 \\ Q1 \end{pmatrix} = \begin{pmatrix} \cos(-\Delta\phi 1) & \sin(-\Delta\phi 1) \\ -\sin(-\Delta\phi 1) & \cos(-\Delta\phi 1) \end{pmatrix} \begin{pmatrix} I \\ Q \end{pmatrix} \quad (6)$$

FIG. 14 is a diagram depicting a fifth example of the optical receiver according to the first embodiment. The optical receiver 200 in FIG. 14 has a hybrid configuration of the third example (FIG. 10) and the fourth example (FIG. 11A through FIG. 13). With reference to FIG. 10 and FIG. 11A through FIG. 13, like parts are given like reference numerals and the explanation thereof will be omitted. As depicted in FIG. 14, the optical receiver 200 may include the frequency variation measurement unit 1001 and the phase converter 1002 instead of the phase variation measurement unit 250 and omit the amplitude adjustment unit 284.

As set forth above, according to the digital coherent receiving by the optical receiver 100, 200 of the first embodiment, the phase variation of the local oscillator lightwave that has not been mixed with the signal lightwave is measured and the phase rotation processing based on the result of the measurement is conducted. As a result, the phase difference between the signal lightwave and the local oscillator lightwave due to the phase variation of the local oscillator lightwave can be compensated.

Further, the maximum frequency of a signal that undergoes the phase rotation processing is reduced because the phase rotation processing based on the result of the measurement is conducted after the chromatic dispersion compensation. Thus, in light of the Nyquist theorem (the sampling theorem), even if the phase rotation processing is slowed, the phase difference between the signal lightwave and the local oscillator lightwave due to the phase variation of the local oscillator lightwave can be compensated. For instance, the downsampling of each signal at the decimation unit 283 at the stage after the chromatic dispersion compensator 281 slows the process at the phase rotation unit 285. As a result, power consumption in the digital processing is reduced.

Furthermore, according to the optical receivers 100, 200, for the phase variation of the local oscillator lightwave, the phase rotation processing is conducted based on the phase variation to which the effect of the dispersion compensation is given. As a result, the degradation of waveform of the local oscillator lightwave component at the dispersion compensation processing is compensated. Thus, even if the phase rotation processing is placed after the dispersion compensation, the phase difference due to the phase variation of the local oscillator lightwave is compensated more accurately.

Furthermore, based on the frequency variation of the local oscillator lightwave, the intensity variation due to the frequency variation is calculated and based on the outcome of the calculation, the amplitude adjustment processing is performed. In this way, the intensity variation due to the phase variation of the local oscillator lightwave is compensated.

Furthermore, the amplitude adjustment processing after the dispersion compensation processing enables the reduction of the maximum frequency of a signal that is given to the amplitude adjustment processing. As a result, as Nyquist theorem indicates, the intensity variation due to the phase variation of the local oscillator lightwave can be compensated with a slower amplitude adjustment processing. For instance, the downsampling at the decimation unit 283 after the chromatic dispersion compensator 281 slows the processing of the amplitude adjustment unit 284. Thus less power is consumed at the digital processing.

Furthermore, according to the optical receiver 100, 200, for the frequency variation of the local oscillator lightwave, the amplitude adjustment processing is conducted based on the frequency variation to which the effect of the dispersion compensation is given. As a result, the intensity variation of the local oscillator lightwave component enlarged by the dispersion compensation. Thus, even if the amplitude adjustment processing is placed after the dispersion compensation, the intensity variation due to the frequency variation of the local oscillator lightwave is compensated more accurately.

According to the optical receiver 200, since two polarized signals are separated before the digital processing, the phase variation (frequency variation beyond 2π can be compensated.

The conventional techniques introduced above (for example, the document of Secondini et al.) cannot compensate the phase difference between the local oscillator lightwave and the signal lightwave that originates from the phase variation caused by a laser source installed on the transmitter's side. One solution to this problem may seem to measure the optical phase of the pilot sub-channel of the signal lightwave and compensate the phase difference based on the measurement. However, the technique of the document of William et al. faces with an error of the measurement due to the phase variation of the local oscillator lightwave because the optical phase of the signal lightwave is calculated based on a mixed signal of the local oscillator lightwave and the signal lightwave.

On the other hand, the optical receiver 100 of the second embodiment measures the phase variation of the signal lightwave coming from the laser source with high accuracy and compensates the phase difference between the local oscillator lightwave and the signal lightwave with high accuracy, thereby improving the transmission quality.

FIG. 15 is a diagram depicting an optical receiver of the second embodiment. With reference to FIG. 1, like parts are given like reference numerals and the explanation thereof will be omitted. The optical receiver 100 according to the second embodiment includes, as depicted in FIG. 15, an optical splitter 1501 and a measurement unit 1502 in place of the optical splitter 101 and the measurement unit 102. The optical splitter 1501 receives the signal lightwave that is input to the optical receiver 100. The optical splitter 1501 splits the incoming signal lightwave and outputs each signal lightwave into the measurement unit 1502 and the receiving unit 103.

The measurement unit 1502 measures the phase variation of the signal lightwave output from the optical splitter 1501 and determines the phase variation of the laser source installed on the transmitter's side. For instance, when the signal lightwave is transmitted by the coherent orthogonal frequency division multiplexing (OFDM) scheme, the measurement unit 1502 extracts a pilot signal (pilot sub-channel) included in the signal lightwave.

The measurement unit 1502 measures the phase variation of the pilot signal. The pilot signal, having a fixed pattern, keeps a constant frequency deviation with respect to the laser source on the transmitter's side. Therefore, the measurement of the phase variation of the pilot signal enables the phase variation of the light source accurately. The measurement unit 1502 outputs the phase variation into the phase processing unit 105.

The receiving unit 103 receives the signal lightwave from the optical splitter 1501 and the local oscillator lightwave. The local oscillator lightwave may come from a light source inside the optical receiver 100 or a light source of a receiving station including the optical receiver 100. The receiving unit 103 receives the signal lightwave using the local oscillator lightwave.

The phase processing unit 105 rotates the phase of the signal output from the receiving unit 103 based on the phase variation presented by the measurement unit 1502. As a result, the phase difference between the signal lightwave and the local oscillator lightwave that is caused by the phase variation of the laser source is compensated (reduced).

According to the optical receiver 100 of FIG. 15, the phase variation of the laser source without the local oscillator lightwave can be measured. Thus, even if the local oscillator lightwave includes the phase variation, the phase variation of the signal lightwave is measured with high accuracy. The phase rotation processing under the measurement of the phase variation enables an accurate compensation of the phase difference between the signal lightwave and the local oscillator lightwave that is caused by the phase variation of the laser source.

Figure 16A:
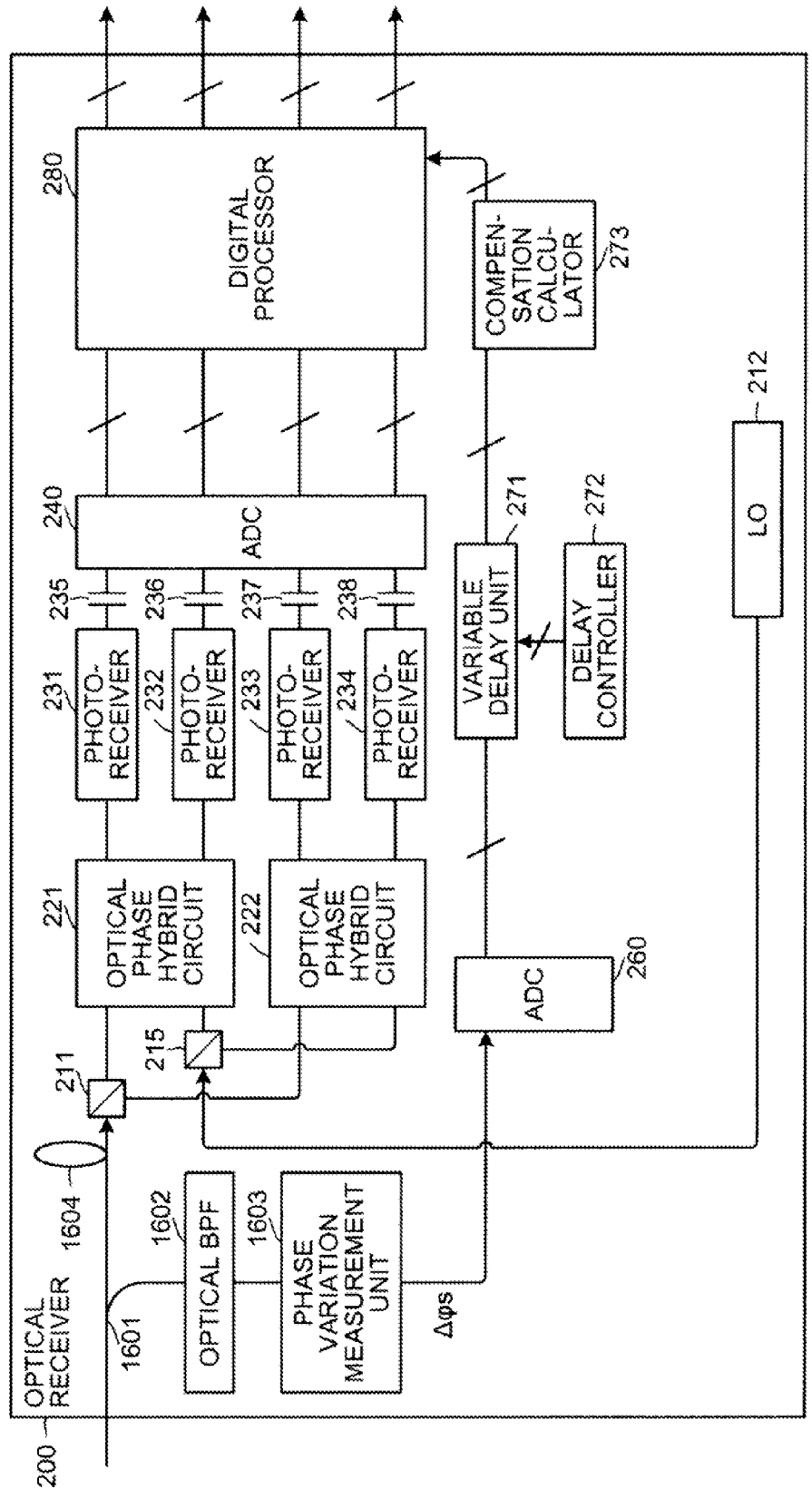
FIG. 16A is a diagram depicting a first example of the optical receiver of the second embodiment.
Figure 16B:
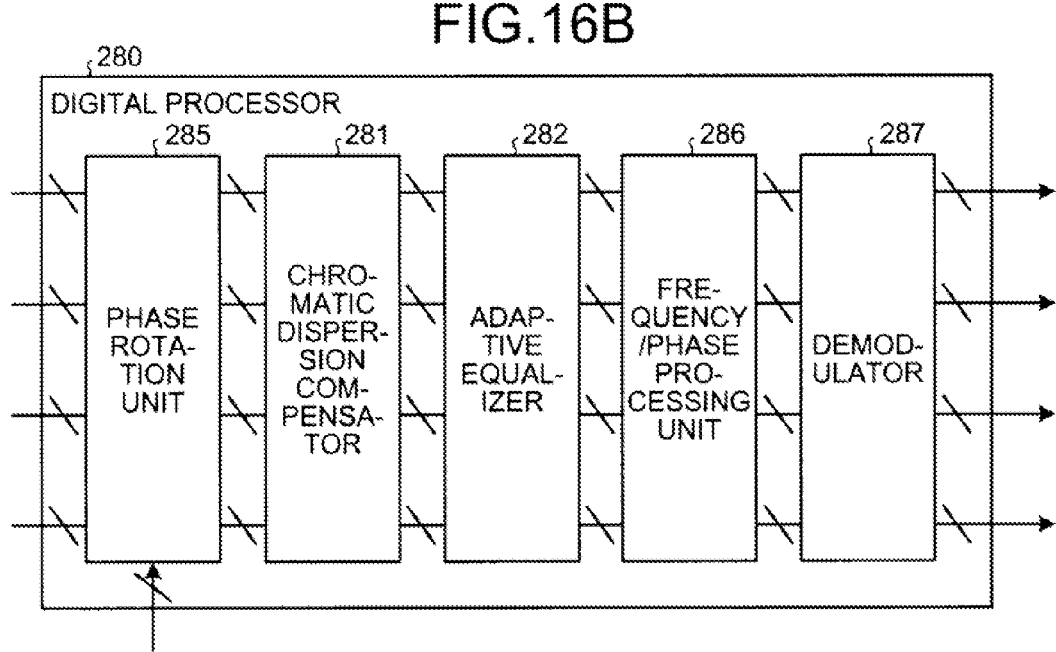
FIG. 16B is a diagram depicting an example of a digital processor of FIG. 16A.

FIG. 16A is a diagram depicting a first example of the optical receiver of the second embodiment. FIG. 16B is a diagram depicting an example of a digital processor of FIG. 16A. With reference to FIGS. 2A and 2B, like parts are given like reference numerals and the explanation thereof will be omitted.

As depicted in FIG. 16A, the optical receiver 200 of the second embodiment includes an optical splitter 1601, an optical band pass filter (BPF) 1602, a phase variation measurement unit 1603, and a delay unit 1604 in place of the optical splitter 213, the delay unit 214, and the phase variation measurement unit 250 of FIG. 2A.

The optical splitter 1601 splits the signal lightwave and outputs each signal lightwave into the polarizing beam splitter and the BPF 1602. The polarizing beam splitter 211 separates polarized waves of the signal lightwave. The BPF 1602 passes a signal of wavelengths in a given range and extracts a pilot signal included in the signal lightwave. The BPF 1602 outputs the pilot signal into the phase variation measurement unit 1603.

The phase variation measurement unit 1603 measures the phase variation of the pilot signal and measures the phase variation $\Delta\phi_s$ of the laser source. The phase variation measurement unit 1603 outputs a phase variation signal that represents the phase variation $\Delta\phi_s$ into the ADC 260. The configuration of the phase variation measurement unit 1603 is similar to that of the phase variation measurement unit 250 depicted in FIG. 4. The ADC 260 converts the phase variation signal ($\Delta\phi_s$) into a digital signal.

The compensation calculator 273 calculates a compensation value for the digital processor 280 based on the phase variation signal ($\Delta\phi_s$). For example, the compensation calculator 273 inverts the phase variation $\Delta\phi_s$. The compensation calculator 273 outputs the inverted phase variation $-\Delta\phi_s$ as a phase compensation value into the digital processor 280.

As depicted in FIG. 16B, the digital processor 280 of the second embodiment includes the phase rotation unit 285, the chromatic dispersion compensator 281, the adaptive equalizer 282, the frequency/phase processing unit 286, and the demodulator 287. In the digital processor 280 of FIG. 16B, the phase rotation unit 285 is placed in the stage prior to the chromatic dispersion compensator 281. The phase rotation unit 285 receives each signal output from the ADC 240.

The phase rotation unit 285 rotates the phase of each signal based on the phase compensation value output from the compensation calculator 273. For example, the phase rotation unit 285 rotates the phase of each signal (I, Q) according to Equation (6) except that the phase variation $-\Delta\phi_1$ is replaced with $-\Delta\phi_s$. In FIGS. 16A and 16B, the chromatic dispersion compensator 281 may omit a function of outputting a dispersion compensation parameter into the compensation calculator 273.

In FIGS. 16A and 16B, the delay controller 272 controls a delay time the variable delay unit 271 imposes on a signal. In this way, the arrival of one of split signal lightwaves at the phase rotation unit 285 undergoing the conversion to the compensation value synchronizes with the arrival of the other signal lightwave at the phase rotation unit 285 undergoing the mixing with the local oscillator lightwave. The delay unit 1604 may be omitted.

Figure 17:
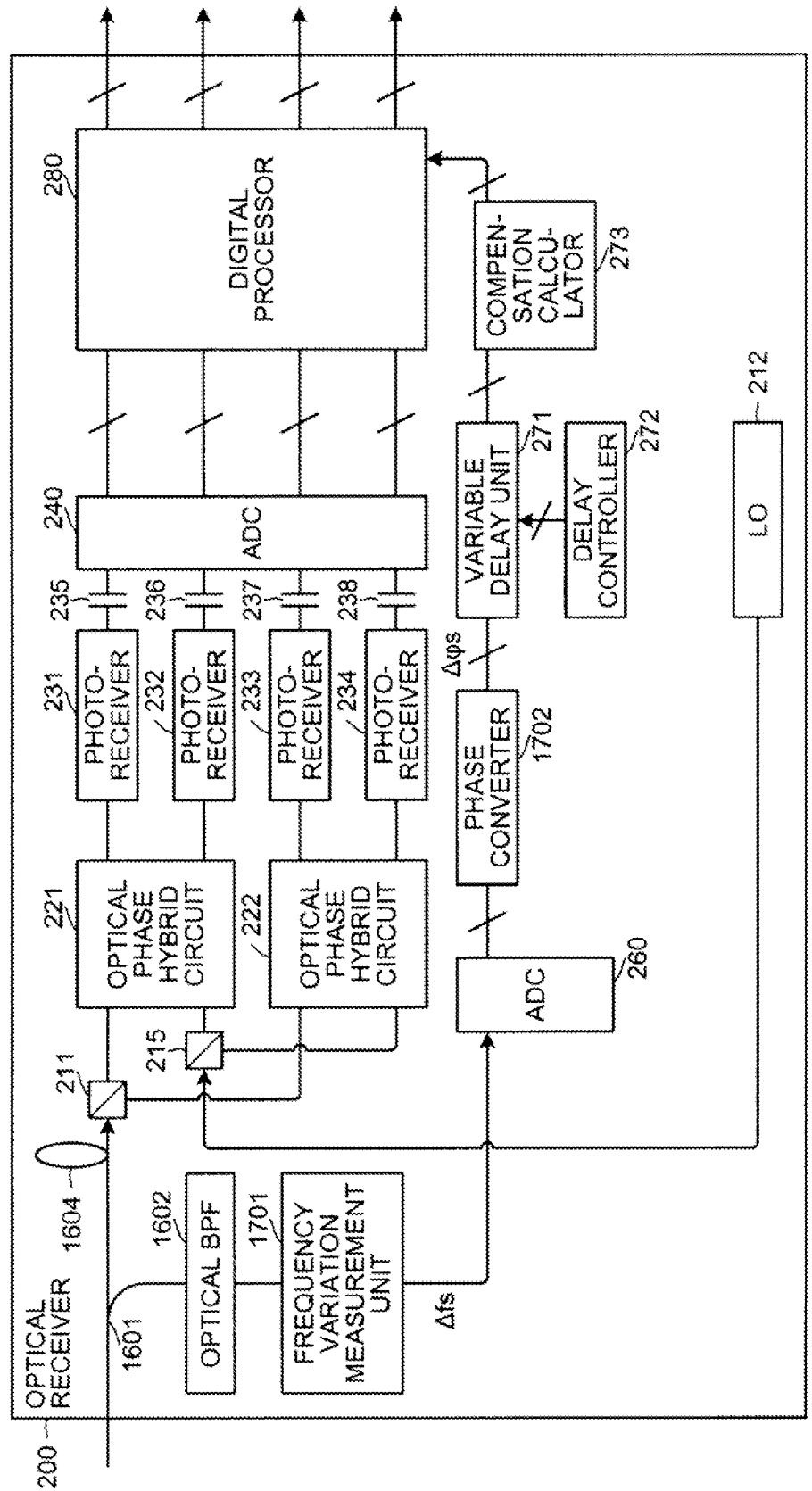
FIG. 17 is a diagram depicting a second example of the optical receiver according to the second embodiment.

FIG. 17 is a diagram depicting a second example of the optical receiver according to the second embodiment. With reference to FIG. 16A, like parts are given like reference numerals and the explanation thereof will be omitted. The configuration of the digital processor 280 of FIG. 17 is the same as FIG. 16B. As depicted in FIG. 17, the optical receiver 200 of the second embodiment may include a frequency variation measurement unit 1701 and a phase converter 1702 instead of the phase variation measurement unit 1603 of FIG. 16A.

In this case, the measurement unit 102 of FIG. 15 may be realized by the frequency variation measurement unit 1701 and the phase converter 1702. The BPF 1602 outputs the extracted pilot signal into the frequency variation measurement unit 1701. The frequency variation measurement unit 1701 measures frequency variation of the pilot signal and measures frequency variation $\Delta f_s$ of the laser source. The frequency variation measurement unit 1701 outputs a frequency variation signal representing the frequency variation $\Delta f_s$ into the ADC 260.

The ADC 260 converts the frequency variation $\Delta f_s$ into a digital signal and outputs the digital signal into the phase converter 1702. The phase converter 1702 converts the digital signal of the frequency variation $\Delta f_s$ into the phase variation $\Delta\phi_s$.

For example, the phase converter 1702 integrates the frequency variation $\Delta f_s$ over time as shown in Equation (5) and converts the frequency variation $\Delta f_s$ into the phase variation $\Delta\phi_s$. The frequency variation $\Delta f_s$ is measured in this way. The phase converter 1702 outputs a phase variation signal representing the phase variation $\Delta\phi_s$ into the variable delay unit 271. The variable delay unit 271 delays the phase variation signal.

Figure 18:
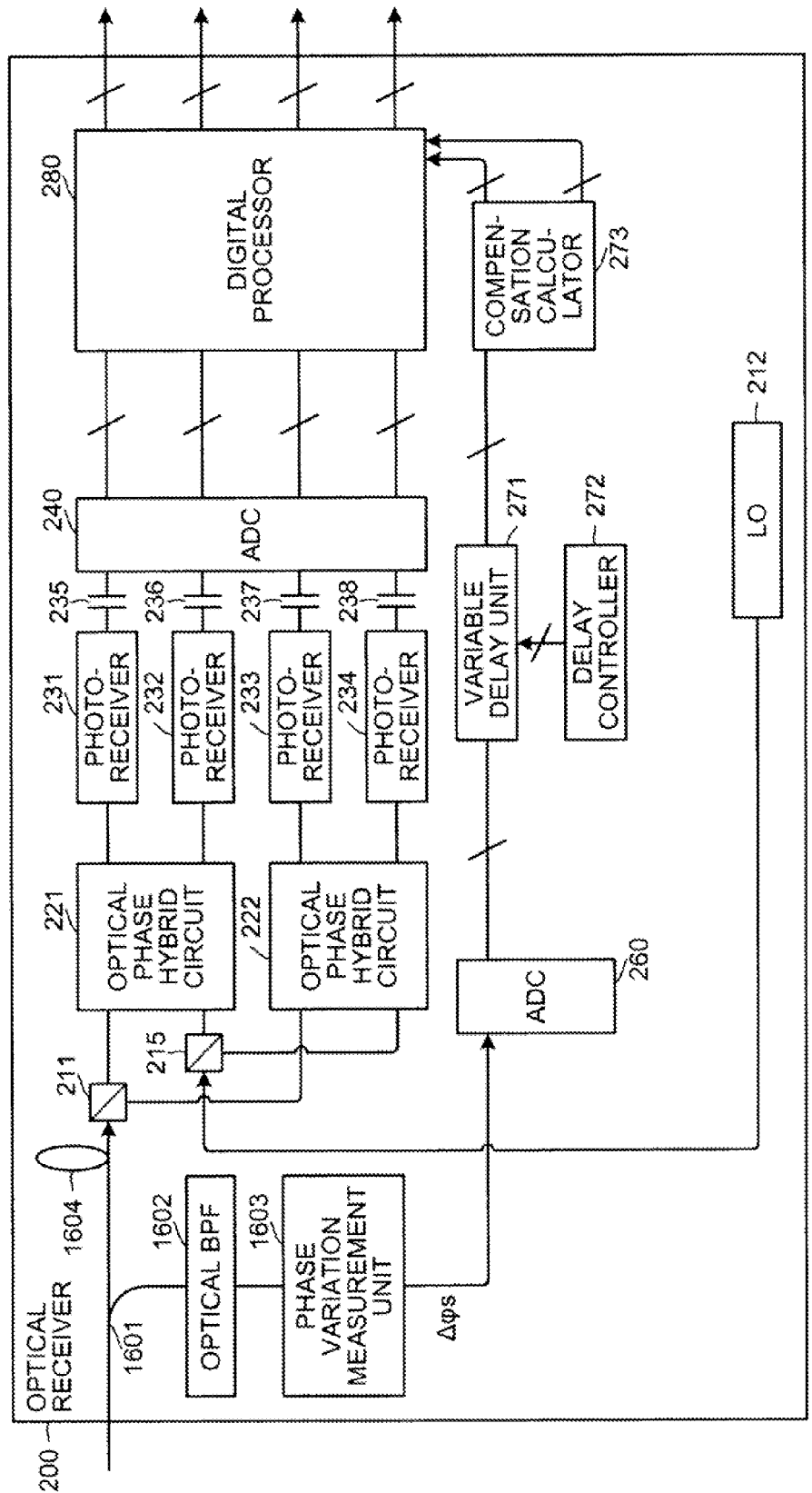
FIG. 18 is a diagram depicting a third example of the optical receiver according to the second embodiment.

FIG. 18 is a diagram depicting a third example of the optical receiver according to the second embodiment. With reference to FIG. 16A, like parts are given like reference numerals and the explanation thereof will be omitted. The configuration of the digital processor 280 of FIG. 18 is the same as the FIG. 2B. The compensation calculator 273 receives the dispersion compensation parameter from the digital processor 280 and the phase variation signal ($\Delta\phi_s$) from the variable delay unit 271.

The compensation calculator 273 calculates each compensation value for the digital processor 280 based on the dispersion compensation parameter and the phase variation signal. The calculation of each compensation value based on the dispersion compensation parameter and the phase variation signal ($\Delta\phi_s$) is identical to the calculation of each compensation value based on the dispersion compensation parameter and the phase variation signal ($\Delta\phi$) depicted in FIG. 6.

As explained above, according to the optical receivers 100, 200 of the second embodiment, the phase variation of the laser source without the influence of the local oscillator lightwave is measured. Even if the phase variation occurs in the local oscillator lightwave, the phase variation of the laser source can be measured with high accuracy. Thus, the phase rotation processing based on the measurement of the phase variation enables an accurate compensation of the phase difference between the signal lightwave and the local oscillator lightwave due to the phase variation of the laser source.

As depicted in FIGS. 18 and 2B, the phase rotation processing after the chromatic dispersion compensation lowers the maximum frequency of a signal that is given to the phase rotation processing. Thus, in light of the Nyquist theorem (the sampling theorem), even if the phase rotation processing is slowed, the phase difference between the signal lightwave and the local oscillator lightwave due to the phase variation of the laser source can be compensated. For instance, the downsampling of each signal at the decimation unit 283 at the stage after the chromatic dispersion compensator 281 slows the process at the phase rotation unit 285. As a result, power consumption in the digital processing is reduced.

Furthermore, the amplitude adjustment processing after the dispersion compensation processing enables the reduction of the maximum frequency of a signal that is given to the amplitude adjustment processing. As a result, as Nyquist theorem indicates, the intensity variation due to the phase variation of the signal lightwave can be compensated with a slower amplitude adjustment processing. For instance, the downsampling at the decimation unit 283 after the chromatic dispersion compensator 281 slows the processing of the amplitude adjustment unit 284. Thus less power is consumed at the digital processing.

According to the optical receiver 200, since two polarized signals are separated before the digital processing, the phase variation (frequency variation beyond $2\pi$ can be compensated.

Figure 19:
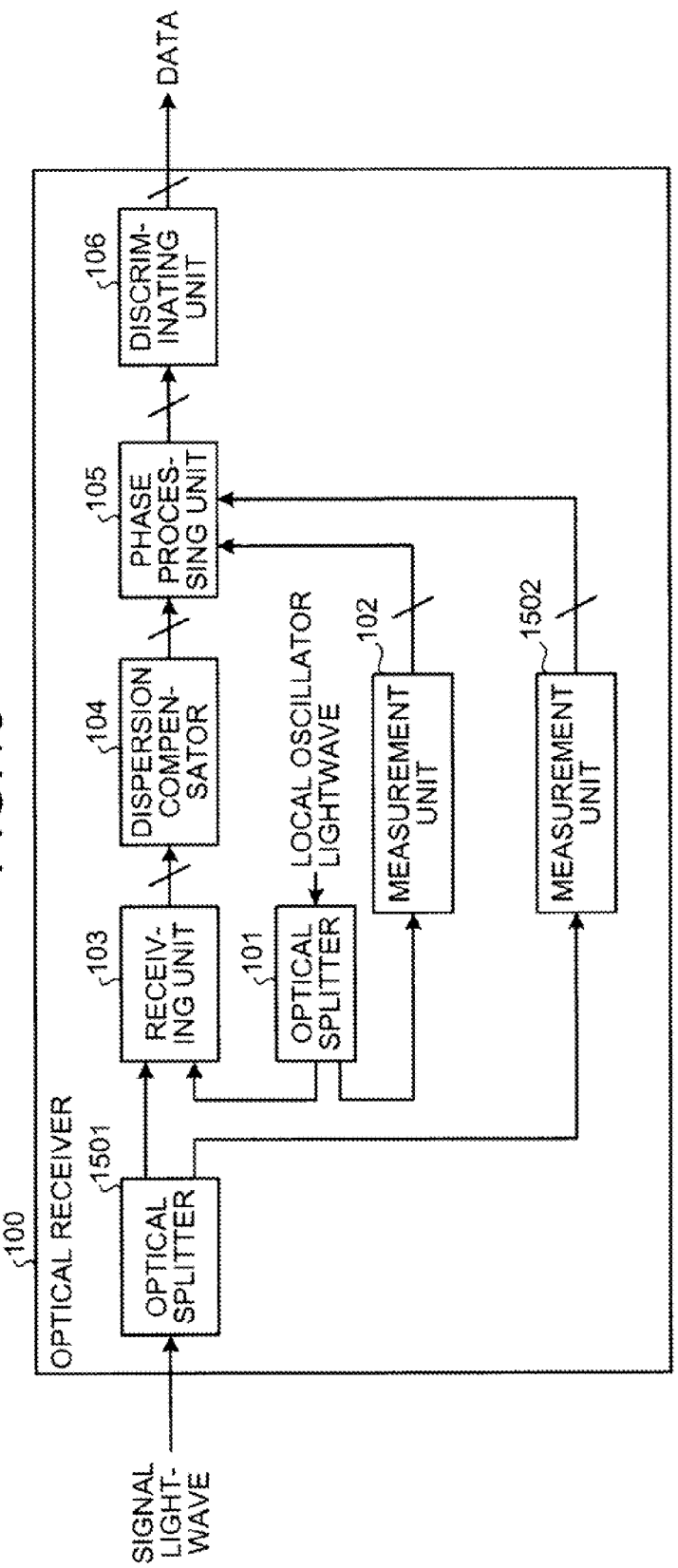
FIG. 19 is a diagram depicting an optical receiver according to a third embodiment.

FIG. 19 is a diagram depicting an optical receiver according to a third embodiment. With reference to FIGS. 1 and 2, like parts are given like reference numerals and the explanation thereof will be omitted. The optical receiver 100 according to the third embodiment is a hybrid of the first and second embodiments. The optical receiver 100 includes the optical splitter 101 (first optical splitter), the measurement unit 102 (first measurement unit), the receiving unit 103, the dispersion compensator 104, the phase processing unit 105, the discriminating unit 106, an optical splitter 1501 (second optical splitter), and a measurement unit 1502 (second measurement unit).

The phase processing unit 105 rotates the phase of a signal output from the dispersion compensator 104 based on the phase variation of the difference between the variation signal of the local oscillator lightwave output from the measurement unit 102 and the variation signal of the signal lightwave output from the measurement unit 1502. As a result, the phase difference between the signal lightwave and the local oscillator lightwave that occurs due to the phase variation of the local oscillator lightwave and the phase variation of the signal lightwave can be compensated.

The phase processing unit 105 rotates the phase of a signal based on the phase variation to which the inverse of the dispersion compensation of the dispersion compensator 104 is given, and on the phase variation from the measurement unit 1502 that represents the phase variation of the laser source. As a result, the degradation of waveform of the local oscillator lightwave component in the signal from the dispersion compensator, caused by the dispersion compensation at the dispersion compensator 104 is compensated (lessened). Thus, the phase difference between the signal lightwave and the local oscillator lightwave that occurs due to the phase variation of the local oscillator lightwave and the phase variation of the signal lightwave can be compensated (lessened) more accurately.

According to the optical receiver 100 of FIG. 19, the phase variation of the local oscillator lightwave alone and the phase variation of the signal lightwave alone are measured and the phase rotation processing is conducted. As a result, the phase difference between the signal lightwave and the local oscillator lightwave due to the phase difference of the laser source and the phase variation of the local oscillator lightwave is compensated, thereby improving the transmission property.

Furthermore, the phase rotation processing on the basis of the measurement that is placed after the dispersion compensation enables the reduction of the maximum frequency of a signal that is given to the phase rotation processing. As a result, as Nyquist theorem (sampling theorem) indicates, the phase difference between the signal lightwave and the local oscillator lightwave due to the phase variation of the signal lightwave and the phase variation of the local oscillator lightwave can be compensated with a slower phase rotation processing. Thus, less power is consumed in the digital processing.

The optical receiver 100 can conduct the phase rotation processing for the difference between the phase variations of the signal lightwave and the local oscillator lightwave based on the phase variation to which the effect of the dispersion compensation is given. As a result, the degradation of waveform of the local oscillator lightwave component due to the dispersion compensation is compensated. Thus, even if the phase rotation processing is placed after the dispersion compensation processing, the phase difference due to the phase variation of the local oscillator lightwave is compensated more accurately.

Figure 20:
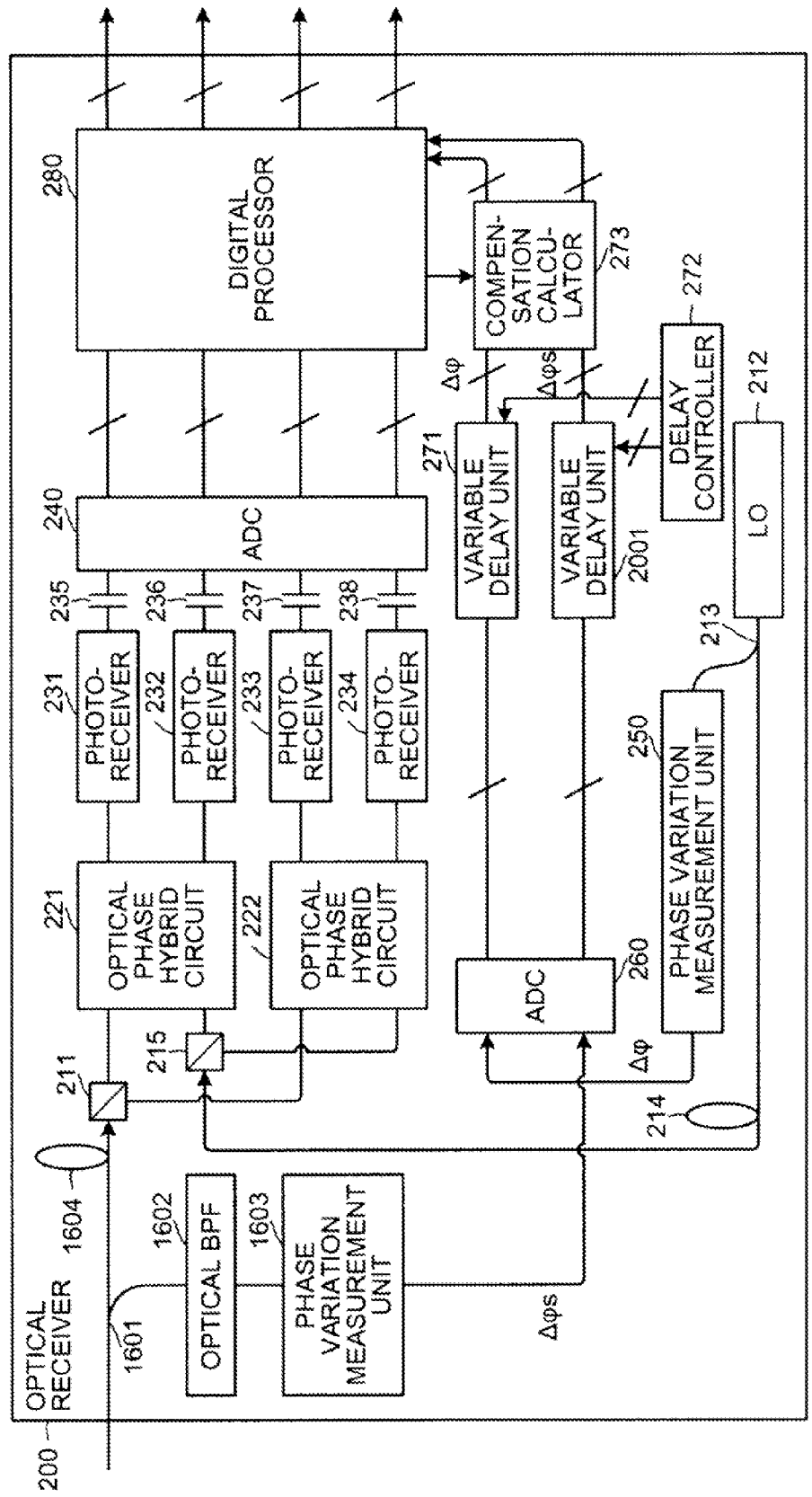
FIG. 20 is a diagram depicting a first example of an optical receiver according to the third embodiment.

FIG. 20 is a diagram depicting a first example of an optical receiver according to the third embodiment. With reference to FIGS. 2A and 16A, like parts are given like reference numerals and the explanation thereof will be omitted. The configuration of the digital processor 280 of FIG. 20 is identical to the digital processor of FIG. 2B. As depicted in FIG. 20, the optical receiver 200 of the third embodiment further includes the optical splitter 1601, the optical BPF 1602, the phase variation measurement unit 1603, the delay unit 1604, and a variable delay unit 2001 in comparison with FIG. 2A.

The ADC 260 receives the phase variation signal representing the phase variation $\Delta\phi$ of local oscillator lightwave and the phase variation signal representing the phase variation $\Delta\phi_s$ of the laser source. The ADC 260 converts each phase variation signal into digital signals. The ADC 260 outputs each digital signal into the variable delay units 271 and 2001.

The variable delay unit 271 delays the phase variation signal ($\Delta\phi$) by a certain time and outputs the delayed signal into the compensation calculator 273. The variable delay unit 2001 delays the phase variation signal ($\Delta\phi_s$) by a certain time and outputs the delayed signal into the compensation calculator 273. The time delay imposed on a signal by the variable delay units 271, 2001 is controlled by the delay controller 272.

The compensation calculator 273 receives the dispersion compensation parameter from the digital processor 280, the phase variation signal ($\Delta\phi$) from the variable delay unit 271, and the phase variation signal ($\Delta\phi_s$) from the variable delay unit 2001. The compensation calculator 273 calculates each compensation value for the digital processor 280 based on the dispersion compensation parameter and the phase variation signals.

Figure 21:
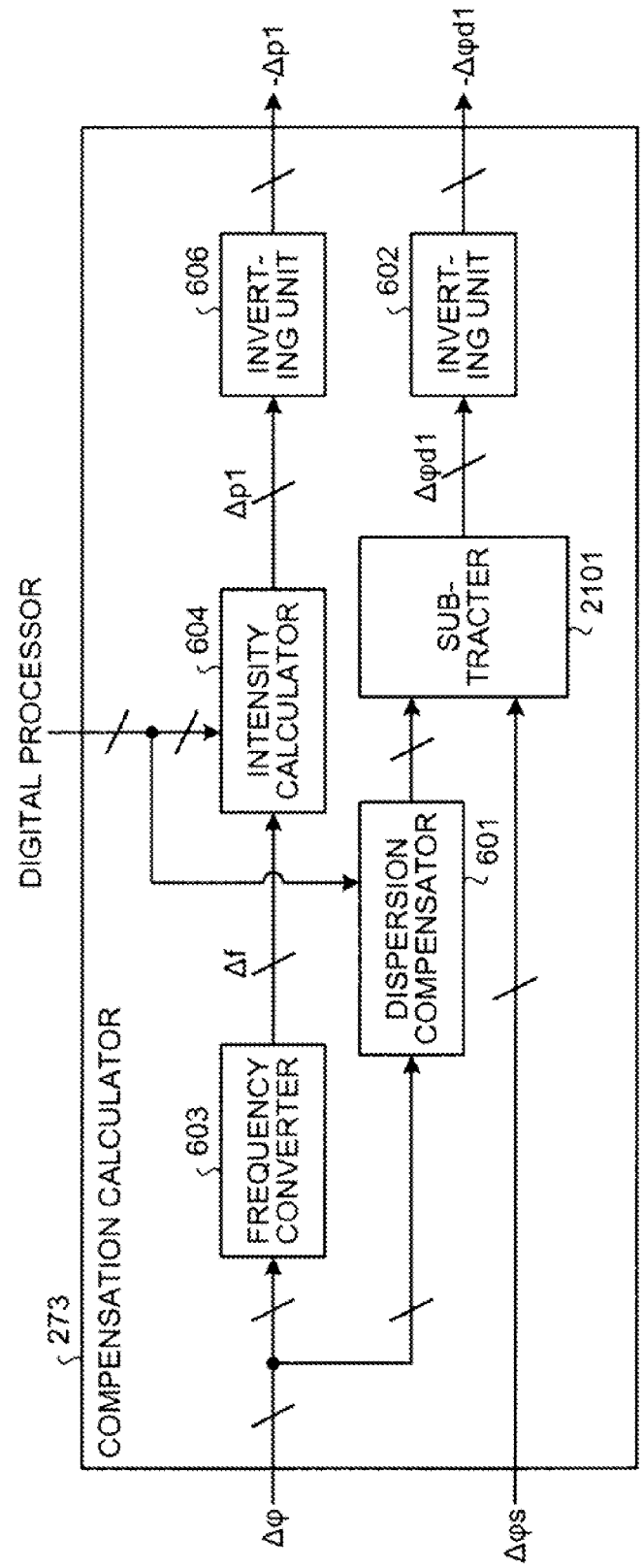
FIG. 21 is a diagram depicting an example of the compensation calculator of FIG. 20.

FIG. 21 is a diagram depicting an example of the compensation calculator of FIG. 20. The compensation calculator 273 of FIG. 21 depicts an exemplary configuration of the compensation calculator 273 of FIG. 20. With reference to FIG. 6, like parts are given like reference numerals and the explanation thereof will be omitted. The compensation calculator 273 of FIG. 21 further includes a subtracter 2101 in comparison with FIG. 6.

The subtracter 2101 performs subtraction between $\Delta\phi_s$ and an output form the dispersion compensator 601. The subtracter 2101 output into the inverting unit 602 the difference obtained by the subtraction. A phase variation signal output from the subtracter 2101 represents a phase difference variation $\Delta\phi_{d1}$ between the local oscillator lightwave having undergone the dispersion compensation and the laser source. In this case, the phase difference variation is due to the phase variation $\Delta\phi_s$ and the phase variation $\Delta\phi$ that comes from the dispersion compensator 601.

The dispersion compensator 601 compensates dispersion of the phase variation $\Delta\phi$ of the local oscillator lightwave. Thus, the phase variation signal from the dispersion compensator 601 represents the phase difference variation $\Delta\phi_1$ of the local oscillator lightwave that has undergone the dispersion compensation of the chromatic dispersion compensator 281. The subtracter 2102 receives $\Delta\phi_1$ and $\Delta\phi_s$ and outputs $\Delta\phi_{d1}$ into the inverting unit 602. A phase compensation value from the inverting unit 602 represents a phase difference variation $-\Delta\phi_{d1}$, the opposite of the phase difference variation $\Delta\phi_{d1}$.

The frequency converter 603 converts the phase difference variation $\Delta\phi$ represented by the phase variation signal of the local oscillator lightwave into the frequency variation. Thus, a frequency variation signal output from the frequency converter 603 represents the frequency variation $\Delta f$ of the local oscillator lightwave that is due to the phase variation $\Delta\phi$ of the local oscillator lightwave. Thus, the intensity variation signal output from the intensity calculator 604 represents a intensity variation $\Delta p_1$ that is caused by the influence of the frequency variation and the chromatic dispersion compensator 281.

The amplitude compensation value output from the inverting unit 606 represents an intensity difference variation $-\Delta p_1$, the opposite of the intensity difference variation $\Delta p_1$ that is influenced by the chromatic dispersion compensator 281.

The amplitude adjustment unit 284 of the digital processor 280 adjusts amplitude of each signal based on the amplitude compensation value ($-\Delta p_1$) of the compensation calculator 273. The phase rotation unit 285 rotates the phase of each signal based on the phase compensation value ($-\Delta \phi_{d1}$) of the compensation calculator 273.

In FIG. 21, the phase rotation unit 285 may be placed before the amplitude adjustment unit 284 as depicted in FIG. 9. Even in this case, the advantage of the optical receiver 200 of FIG. 20 can be obtained.

Figure 22:
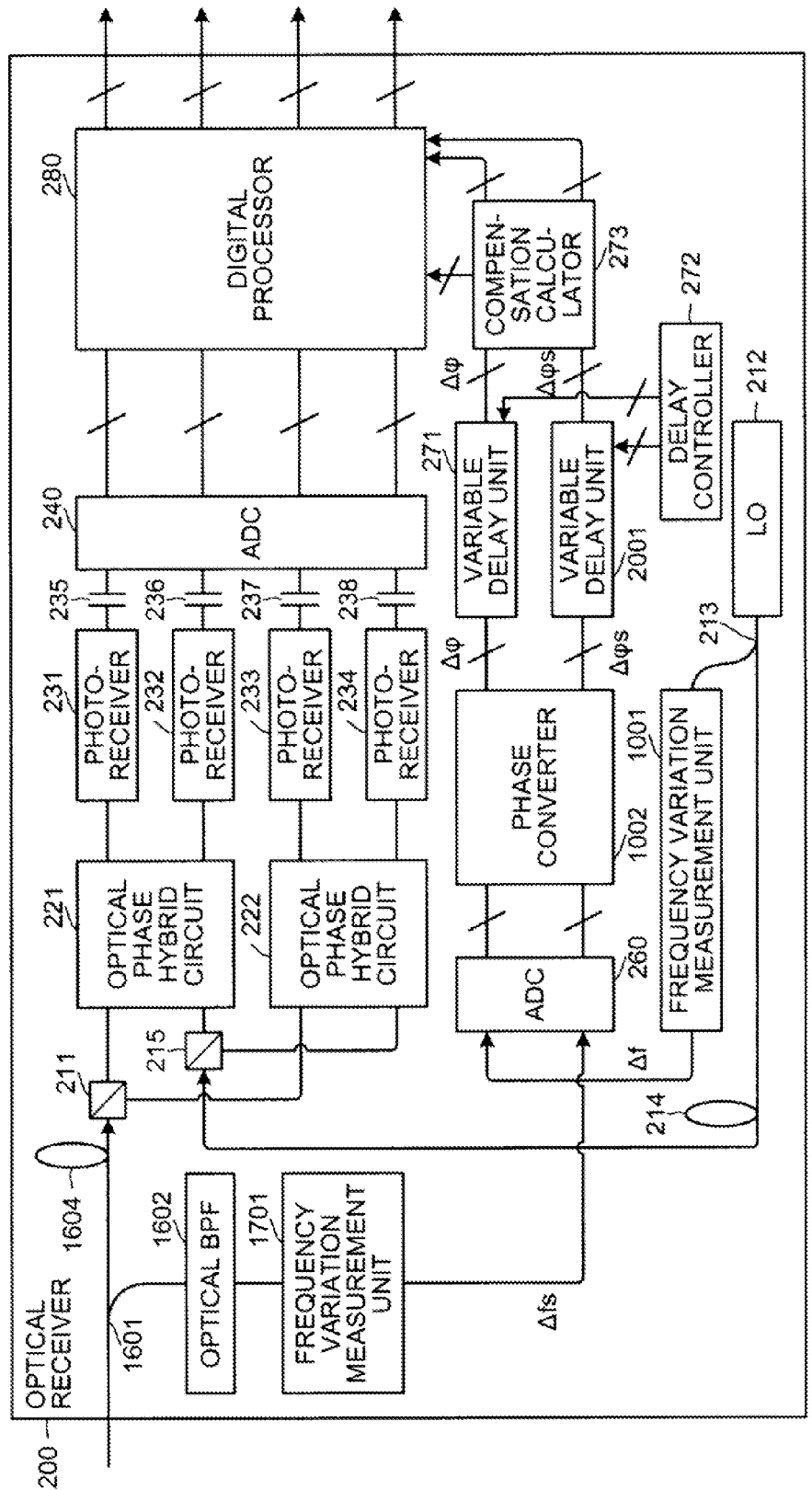
FIG. 22 is a diagram depicting a second example of the optical receiver according to the third embodiment.
Figure 23:
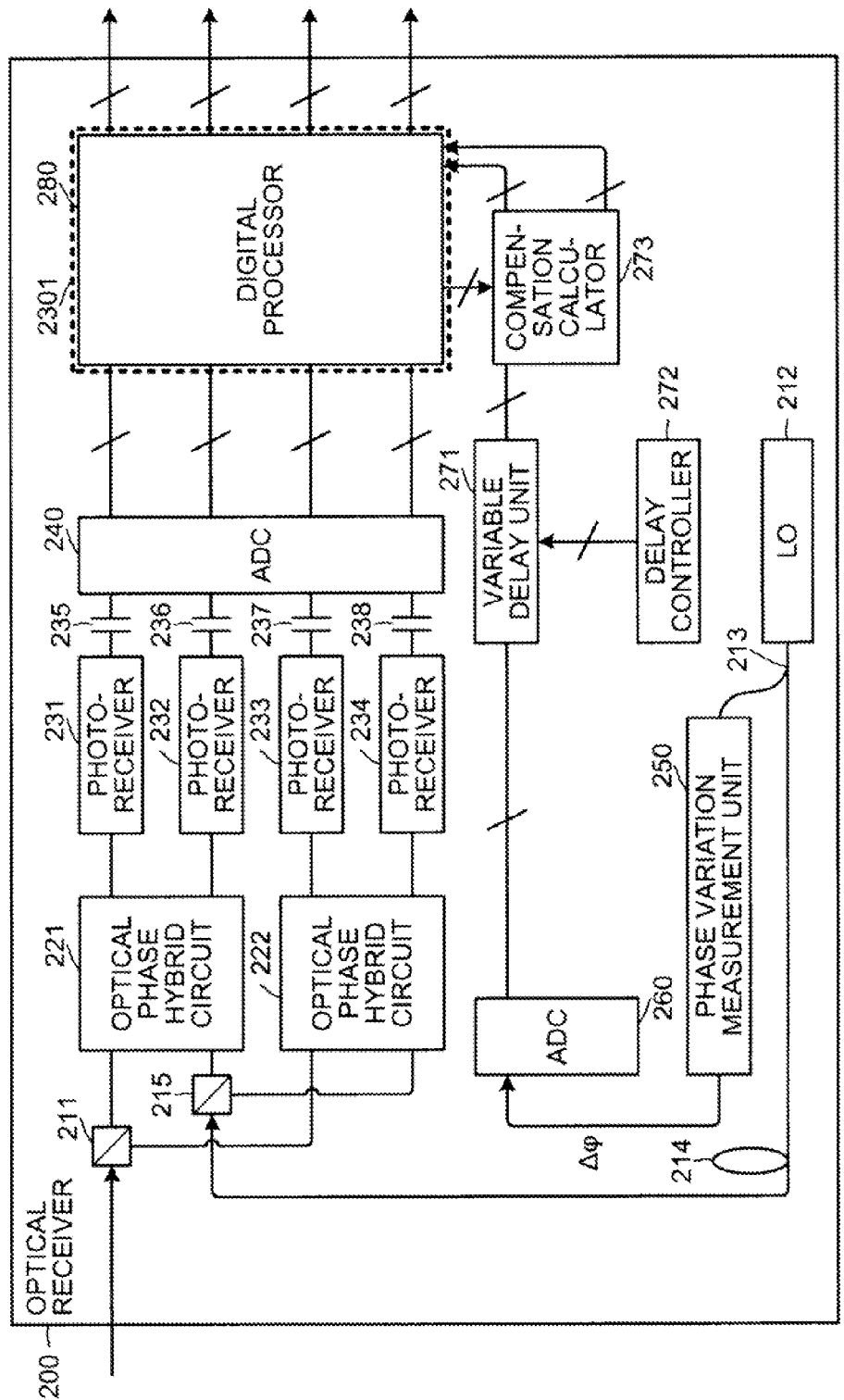
Figure 24:
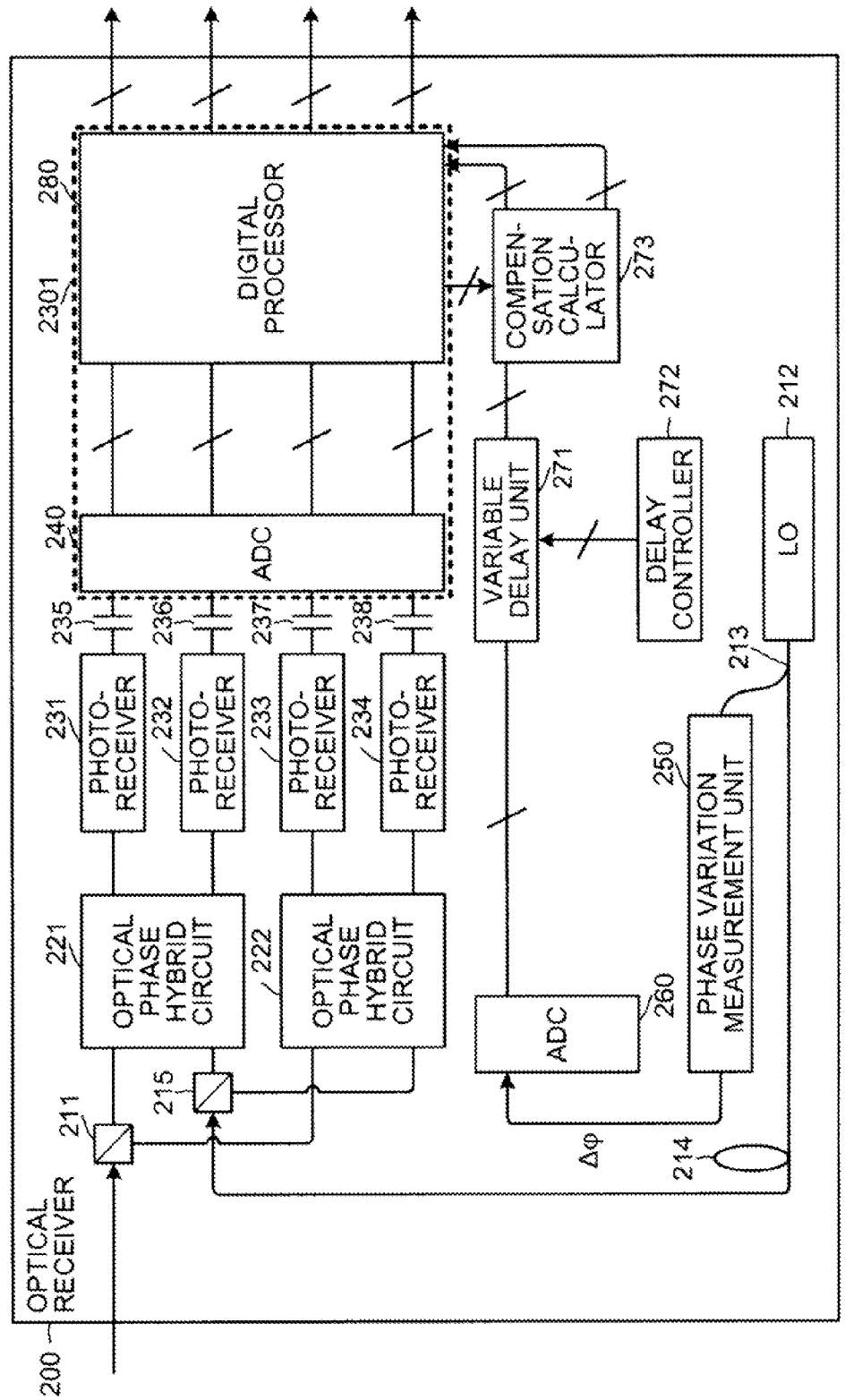
Figure 25:
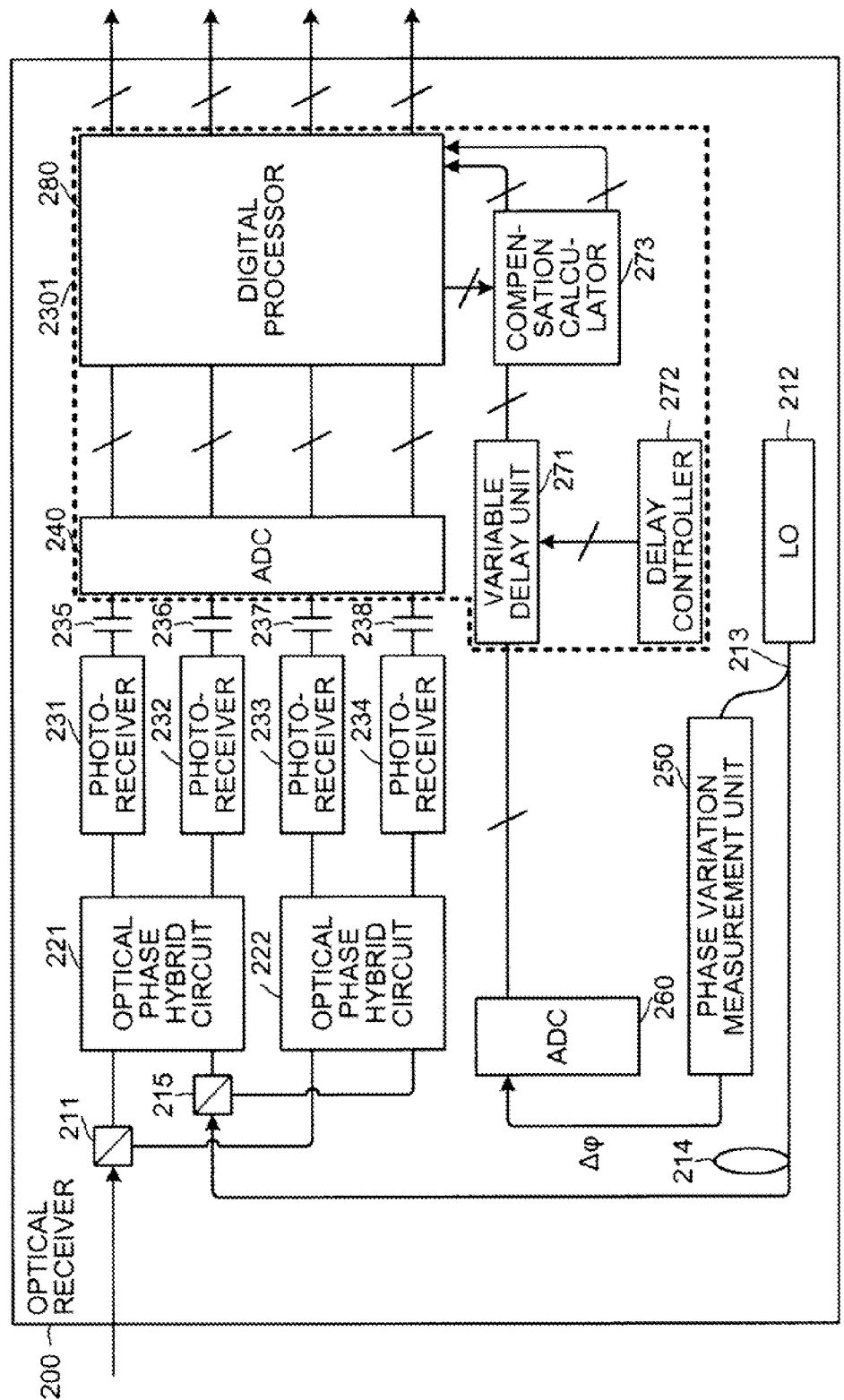
Figure 26:
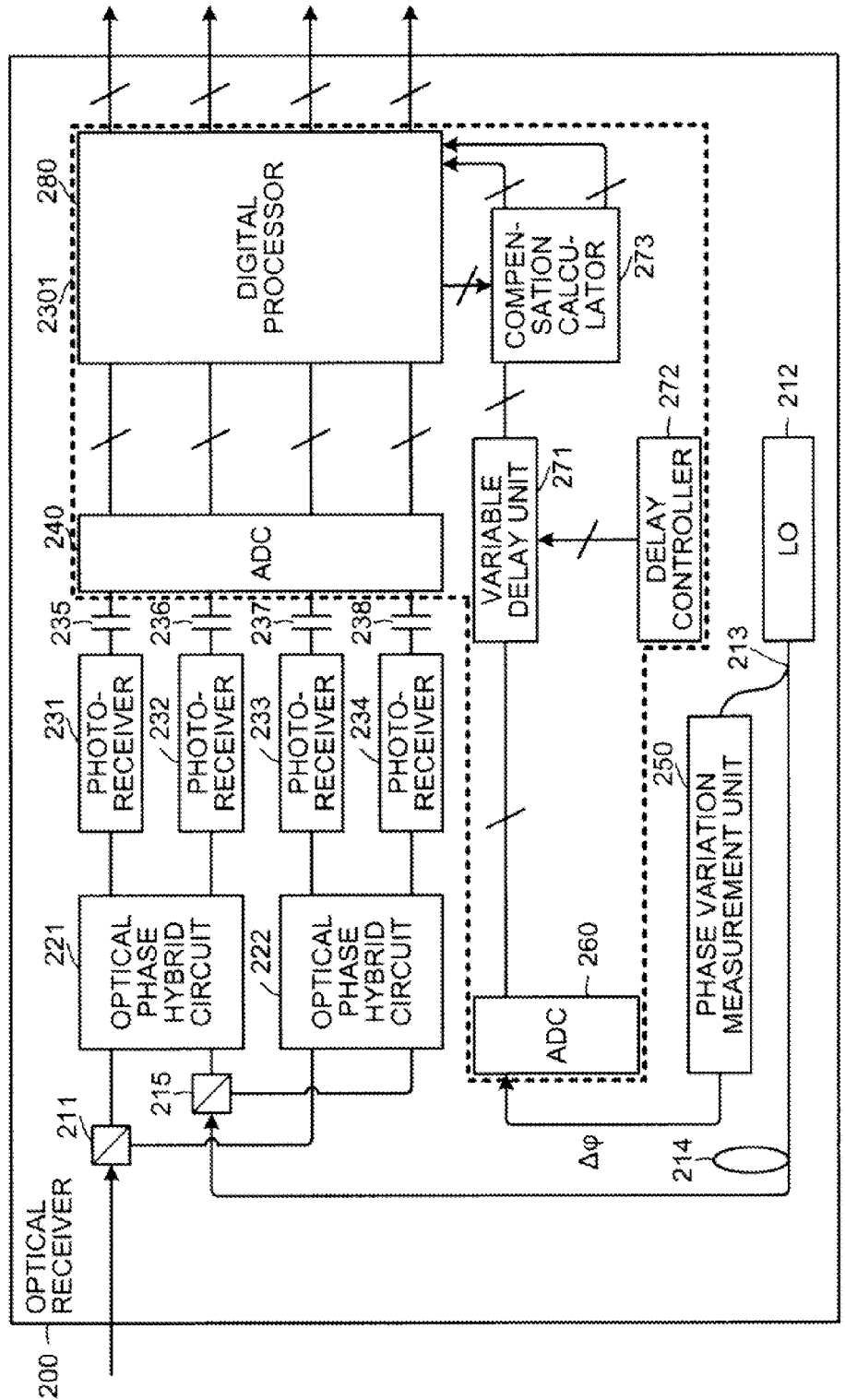

FIG. 22 is a diagram depicting a second example of the optical receiver according to the third embodiment. With reference to FIGS. 10, 17, and 20, like parts are given like reference numerals and the explanation thereof will be omitted. As depicted in FIG. 22, the optical receiver 200 includes the frequency variation measurement units 1001, 1701, and the phase converter 1002 instead of the phase variation measurement units 250, 1603 of FIG. 20.

The ADC 260 receives the frequency variation signal representing the frequency variation $\Delta f$ of the local oscillator lightwave and the frequency variation signal representing the frequency variation $\Delta f_s$ of the signal lightwave. The ADC 260 converts each frequency variation signal into digital signals. The ADC 260 outputs each digital signal into the phase converter 1002.

The phase converter 1002 converts the frequency variation $\Delta f$ into the phase variation $\Delta \phi$ and outputs a phase variation signal representing the phase variation $\Delta \phi$ into the variable delay unit 271. The phase converter 1002 converts the frequency variation $\Delta f_s$ into the phase variation $\Delta \phi_s$ and outputs a phase variation signal representing the phase variation $\Delta \phi_s$ into the variable delay unit 2001.

The variable delay unit 271 delays the phase variation signal ($\Delta \phi$) output from the phase converter 1002. The variable delay unit 2001 delays the phase variation signal ($\Delta \phi_s$) output from the phase converter 1002.

In FIG. 22, the phase rotation unit 285 may be placed before the amplitude adjustment unit 284 as depicted in FIG. 9. Even in this case, the advantage of the optical receiver 200 of FIG. 22 can be obtained. As explained above, the optical receiver 100 of the third embodiment brings out the advantage of the first and second embodiment.

FIGS. 23, 24, 25, 26, and 27 are diagrams depicting an example of a configuration mounted on a semiconductor integrated circuit. In FIG. 23-27, a dotted line frame 2301 depicts a range that is mounted on one package of a semiconductor integrated circuit. Examples of FIG. 23-27 can be applied to the figures of the embodiments (FIGS. 10, 11A, 14, 16A, 17, 18, 20, and 22).

As set forth above, according to the optical receiver, the signal processor, and the optical receiving method of the embodiments, power consumption is reduced.

According to the signal processor and the optical receiving method, power consumption in a digital signal processing circuit is reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An optical receiver comprising:
   a splitter that splits a local oscillator lightwave into a first local oscillator lightwave and a second local oscillator lightwave;
   a measurement unit that measures phase variation of the first local oscillator lightwave and outputs a phase variation signal indicating the measured phase variation;
   a receiving unit that receives a signal lightwave and the second local oscillator lightwave and mixes these lightwaves and converts the mixed lightwaves into a digital signal;
   a dispersion compensator that reduces chromatic dispersion of the digital signal by giving a predetermined dispersion property to the digital signal, and outputs a dispersion compensation parameter indicating the predetermined dispersion property;
   a compensation calculator that calculates a phase compensation value by compensating for dispersion of the phase variation signal according to the dispersion compensation parameter, and inverting the dispersion-compensated phase variation signal;
   a phase processing unit that rotates phase of the dispersion-reduced digital signal based on the phase compensation value, thereby rotating the phase based on the phase variation to which the predetermined dispersion property is given; and
   a discriminating unit that discriminates the phase-rotated signal.

2. The optical receiver according to claim 1, wherein
   the compensation calculator further includes
      a frequency measurement unit that measures frequency variation of the first or second local oscillator lightwave; and
      a calculator that calculates intensity variation due to the frequency variation of the local oscillator lightwave based on the frequency variation, and
   the optical receiver further includes an amplitude processing unit that adjusts amplitude of the dispersion-reduced digital signal based on the intensity variation.

3. The optical receiver according to claim 2, wherein
   the amplitude processing unit adjusts the amplitude based on the intensity variation to which the predetermined dispersion property is given.

4. The optical receiver according to claim 2, further comprising
   a decimation unit that performs downsampling that decimates the dispersion-reduced digital signal,
   wherein the phase processing unit adjusts the amplitude of the downsampled signal.

5. The optical receiver according to claim 1, further comprising
   a decimation unit that performs downsampling that decimates the dispersion-reduced digital signal,
   wherein the phase processing unit rotates the downsampled signals.

6. The optical receiver according to claim 1, wherein the signal lightwave is a polarization multiplexed signal.

7. An optical receiver comprising:
   a splitter that splits an signal lightwave into a first signal lightwave and a second signal lightwave;

a measurement unit that measures phase variation of the first signal lightwave and outputs a phase variation signal indicating the measured phase variation;

a compensation calculator that calculates a phase compensation value by inverting the phase variation signal;

a receiving unit that receives a local oscillator lightwave and the second signal lightwave and mixes these lightwaves and converts the mixed lightwaves into a digital signal; and a phase processing unit that rotates phase of the digital signal based on the phase compensation value.

8. The optical receiver according to claim 7, wherein the compensation calculator further includes a frequency measurement unit that measures frequency variation of the first or second signal lightwave; and a calculator that calculates intensity variation due to the frequency variation of the first or second signal lightwave based on the measured frequency variation, and the optical receiver further includes an amplitude processing unit that adjusts amplitude of the digital signal based on the intensity variation.

9. An optical receiver comprising:

a first splitter that splits a local oscillator lightwave into a first local oscillator lightwave and a second local oscillator lightwave;

a second splitter that splits a signal lightwave into a first signal lightwave and a second signal lightwave;

a first measurement unit that measures a first phase variation of the first local oscillator lightwave and outputs a first phase variation signal indicating the measured first phase variation;

a second measurement unit that measures a second phase variation of the first signal lightwave and outputs a second phase variation signal indicating the measured second phase variation;

a receiving unit that receives the second local oscillator lightwave and the second signal lightwave and mixes these the lightwaves and converts the mixed lightwaves into a digital signal;

a dispersion compensator that reduces chromatic dispersion of the digital signal by giving a predetermined dispersion property to the digital signal, and outputs a dispersion compensation parameter indicating the predetermined dispersion property;

a compensation calculator that calculates a phase compensation value by compensating for dispersion of the first phase variation signal according to the dispersion compensation parameter, performing subtraction between the dispersion-compensated first phase variation signal and the second phase variation signal, and inverting the difference obtained by the subtraction;

a phase processing unit that rotates phase of the dispersion-reduced digital signal based on the phase compensation value; and a discriminating unit that discriminates the phase-rotated signal.

10. A signal processor applied to an optical receiver that includes a splitter that splits a local oscillator lightwave into a first local oscillator lightwave and a second local oscillator lightwave; a measurement unit that measures phase variation of the first local oscillator lightwave and outputs a phase variation signal indicating the measured phase variation; and a receiving unit that receives a signal lightwave and the second local oscillator lightwave and mixes these lightwaves and converts the mixed lightwaves into a digital signal, the signal processor comprising:

a dispersion compensator that reduces chromatic dispersion of the digital signal by giving a predetermined dispersion property to the digital signal, and outputs a dispersion compensation parameter indicating the predetermined dispersion property;

a compensation calculator that calculates a phase compensation value by compensating for dispersion of the phase variation signal according to the dispersion compensation parameter, and inverting the dispersion-compensated phase variation signal;

a phase processing unit that rotates phase of the dispersion-reduced digital signal based on the phase compensation value, thereby rotating the phase based on the phase variation to which the predetermined dispersion property is given; and a discriminating unit that discriminates the phase-rotated signal.

11. An optical receiving method performed by an optical receiver that includes a splitter that splits a local oscillator lightwave into a first local oscillator lightwave and a second local oscillator lightwave; a measurement unit that measures phase variation of the first local oscillator lightwave and outputs a phase variation signal indicating the measured phase variation; and a receiving unit that receives a signal lightwave and the second local oscillator lightwave and mixes these lightwaves and converts the mixed lightwaves into a digital signal, the optical receiving method comprising:

reducing chromatic dispersion of the digital signal by giving a predetermined dispersion property to the digital signal, and outputting a dispersion compensation parameter indicating the predetermined dispersion property;

calculating a phase compensation value by compensating for dispersion of the phase variation signal according to the dispersion compensation parameter, and inverting the dispersion-compensated phase variation signal;

rotating phase of the dispersion-reduced digital signal based on the phase compensation value, thereby rotating the phase based on the phase variation to which the predetermined dispersion property is given; and discriminating the phase-rotated signal.

* * * * *